United States Patent
Park

(10) Patent No.: US 12,114,331 B2
(45) Date of Patent: *Oct. 8, 2024

(54) CONTROL CHANNEL AND DATA CHANNEL TRANSMISSION/RECEPTION METHOD AND APPARATUS FOR NR SYSTEM

(71) Applicant: Cisco Technology, Inc., San Jose, CA (US)

(72) Inventor: Dong Hyun Park, Seoul (KR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/202,001

(22) Filed: May 25, 2023

(65) Prior Publication Data

US 2023/0300849 A1    Sep. 21, 2023

Related U.S. Application Data

(63) Continuation of application No. 17/161,013, filed on Jan. 28, 2021, now Pat. No. 11,825,484, which is a
(Continued)

(30) Foreign Application Priority Data

May 27, 2016 (KR) .................. 10-2016-0065166
May 24, 2017 (KR) .................. 10-2017-0064371
May 26, 2017 (KR) .................. 10-2017-0065238

(51) Int. Cl.
*H04W 72/23* (2023.01)

(52) U.S. Cl.
CPC .................. *H04W 72/23* (2023.01)

(58) Field of Classification Search
None
See application file for complete search history.

(56) References Cited

U.S. PATENT DOCUMENTS 9,603,169 B2   3/2017  Kim et al.
10,912,071 B2*  2/2021  Panteleev ............ H04L 5/001
(Continued)

FOREIGN PATENT DOCUMENTS

CN   102740488 A   10/2012
CN   104145443 A   11/2014
(Continued)

OTHER PUBLICATIONS

Chinese Search Report for Chinese Application No. 2017800465513, issued on Jan. 5, 2022, 1 Page.
(Continued)

*Primary Examiner* — Xavier S Wong

(57) ABSTRACT

Provided is a scheduling information transmission/reception method and apparatus for an NR system in a wireless communication system. A method for receiving, by a terminal, scheduling information for data transmission or reception in a wireless communication system according to one aspect of the present invention may comprise the steps of: receiving, from a base station, information indicating a first physical resource supporting a first subcarrier spacing within a time interval and a second physical resource supporting a second subcarrier spacing within the time interval; receiving at least one of first scheduling information for the first physical resource and second scheduling information for the second physical resource; and performing the data transmission or reception on the basis of the at least one of the first scheduling information and the second scheduling information.

20 Claims, 7 Drawing Sheets

Related U.S. Application Data continuation of application No. 16/304,902, filed as application No. PCT/KR2017/005523 on May 26, 2017, now Pat. No. 10,945,252.

(56) References Cited

U.S. PATENT DOCUMENTS

| | | | |
|---|---|---|---|
| 10,945,252 B2* | 3/2021 | Park | H04L 5/001 |
| 10,993,255 B2 | 4/2021 | Kim et al. | |
| 11,115,868 B2* | 9/2021 | Kim | H04L 5/0091 |
| 11,825,484 B2* | 11/2023 | Park | H04L 5/0094 |
| 2010/0110964 A1 | 5/2010 | Love et al. | |
| 2011/0243079 A1 | 10/2011 | Chen et al. | |
| 2012/0039279 A1 | 2/2012 | Chen et al. | |
| 2014/0204851 A1 | 7/2014 | Chen et al. | |
| 2015/0208387 A1 | 7/2015 | Awad et al. | |
| 2015/0358983 A1 | 12/2015 | Frenger et al. | |
| 2017/0238313 A1 | 8/2017 | Wang et al. | |
| 2017/0273058 A1 | 9/2017 | Agiwal et al. | |
| 2017/0280331 A1 | 9/2017 | Gou et al. | |
| 2017/0347354 A1 | 11/2017 | Yang et al. | |
| 2018/0019859 A1 | 1/2018 | Cheng et al. | |
| 2018/0279289 A1* | 9/2018 | Islam | H04W 72/0446 |
| 2019/0342782 A1 | 11/2019 | Yum et al. | |
| 2020/0059290 A1 | 2/2020 | Pan et al. | |
| 2022/0132534 A1 | 4/2022 | Jang et al. | |

FOREIGN PATENT DOCUMENTS

| | | |
|---|---|---|
| KR | 10-2011-0070795 | 6/2011 |
| WO | 2013002583 A2 | 1/2013 |
| WO | 2014/133320 A1 | 9/2014 |
| WO | 2016/040290 A1 | 3/2016 |

OTHER PUBLICATIONS

English Translation of Office Action in Chinese Application No. 201780046551.3, mailed Jan. 11, 2022, 12 pages.

First Examination Report in Indian Application No. 201817049428, mailed on Jun. 17, 2021, 6 pages.

English Translation of Preliminary Rejection Office Action in Korean Application No. 10-2017-0065238, mailed Aug. 11, 2021, 11 pages.

Examination Report in European Application No. 17803113.4, mailed Sep. 20, 2021, 7 pages.

Samsung, "DCI Contents for NR," 3GPP TSG RAN WG1 Meeting #89, Agenda item: 7.1.3.14, R1-1707995, May 15-19, 2017, 5 pages.

NTT Docomo, Inc., "Resource allocation for DL/UL data," 3GPP TSG RAN WG1 Meeting #88bis, Agenda item: 8.1.3.3.1, R1-1705746, Apr. 3-7, 2017, 4 pages.

Intel Corporation, "Bandwidth parts configuration and operations," R1-1707420, 3GPP TSG RAN WG1 Meeting #89, May 2017, 5 pages.

Mediatek Inc., "The starting and ending position in time domain of PUSCH," R1-1707844, 3GPP TSG RAN WG! Meeting #89, May 2017, 4 pages.

Panasonic, "Discussion on the multiplexing of different numerologies," R1-164985, 3GPP TSG-RAN WG1 Meeting 85, May 2016, 5 pages.

Extended European Search Report in European Application No. 17803113.4, mailed Jan. 20, 2020, 11 pages.

NEC, "Enhancements to Coordinated Multi-point Operation: Impact of interference averaging," R1-164489, 3GPP TSG-RAN WG1 Meeting #85, May 2016, 5 pages.

Intel Corporation, "Subcarrier spacing and scaling for new RAT," R1-164179, 3GPP TSG RAN WG1 Meeting #85, May 2016, 3 pages.

NEC, "Subcarrier spacing and other parameters for numerology," R1-164486, 3GPP TSG RAN WG1 Meeting #85, May 2016, 3 pages.

International Preliminary Report on Patentability in International Application No. PCT/KR2017/005523, mailed Nov. 27, 2018, 7 pages.

Written Opinion of the International Searching Authority in International Application No. PCT/KR2017/005523, mailed Sep. 6, 2017, 9 pages.

International Search Report in International Application No. PCT/KR2017/005523, mailed Sep. 6, 2017, 12 pages.

Examination Report in counterpart European Application No. 17 803 113.4, mailed Jun. 15, 2023, 7 pages.

Office Action for Korean Application No. 1020220150201, Feb. 8, 2024, 4 pages.

* cited by examiner (a)　　　　　(b)　　　　　(c)

(a)　　　　　(b)　　　　　(c)

CONTROL CHANNEL AND DATA CHANNEL TRANSMISSION/RECEPTION METHOD AND APPARATUS FOR NR SYSTEM

CROSS-REFERENCE TO RELATED APPLICATIONS

This application is a continuation of U.S. patent application Ser. No. 17/161,013, filed Jan. 28, 2021, now U.S. Pat. No. 11,825,484, which is a continuation of U.S. patent application Ser. No. 16/304,902, filed on Nov. 27, 2018, now U.S. Pat. No. 10,945,252, which is the National Entry of International Patent Application No. PCT/KR2017/005523, filed on May 26, 2017, which claims priority from and the benefit of Korean Patent Application No. 10-2017-0065238, filed on May 26, 2017, 10-2017-0064371, filed on May 24, 2017, and 10-2016-0065166, filed on May 27, 2016, each of which is hereby incorporated by reference in its entirety.

FIELD

The present disclosure relates to a wireless communication system, and more particularly, to a method, apparatus, software for transmission and reception of a control channel and a data channel for a new radio (NR) system, or a storage medium storing software.

DISCUSSION OF THE BACKGROUND

The IMT (International Mobile Telecommunication) frameworks and standards have been developed by ITU (International Telecommunication Union) and, recently, the 5th generation (5G) communication has been discussed through a program called "IMT for 2020 and beyond".

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility. Also, to meet such various scenarios and various requirements in a single NR system, it is conceivable to support a scalable numerology. However, no detailed method for supporting the scalable numerology in the NR system has been defined yet.

SUMMARY

An aspect of the present disclosure provides a method and apparatus for transmission and reception of a control channel and a data channel in a new wireless communication system supporting a scalable numerology. The above description is to explain the technical aspects of exemplary embodiments of the present invention, and it will be apparent to those skills in the art that modifications and variations can be made without departing from the spirit and scope of the present invention.

According to an aspect of the present disclosure, there is provided a method of receiving, by a terminal, scheduling information for data transmission or reception in a wireless communication system, the method including receiving, from a base station, information indicating a first physical resource that supports a first subcarrier spacing within a time interval and a second physical resource that supports a second subcarrier spacing within the time interval; receiving at least one of first scheduling information for the first physical resource and second scheduling information for the second physical resource; and performing the data transmission or reception based on at least one of the first scheduling information and the second scheduling information. The features of the present disclosure briefly summarized as above are provided as only aspects of the detailed description of the present disclosure and are nut provided to limit the scope of the present disclosure.

According to the present disclosure, there may be provided a method and apparatus for transmission and reception of a control channel and a data channel in a new wireless communication system supporting a scalable numerology.

The above description is to explain the technical aspects of exemplary embodiments of the present invention, and it will be apparent to those skills in the art that modifications and variations can be made without departing from the spirit and scope of the present invention. Thus, it is intended that the present invention ewer the modifications and variations of this invention provided they come within the scope of the appended claims and their equivalents.

BRIEF DESCRIPTION OF DRAWINGS

Various examples will be described more fully hereinafter with reference to the accompanying drawings. Throughout the drawings and the detailed description, unless otherwise described, the same drawing reference numerals are understood to refer to the same elements, features, and structures. In describing the examples, detailed description on known configurations or functions may be omitted for clarity and conciseness.

DETAILED DESCRIPTION

Figure 1:
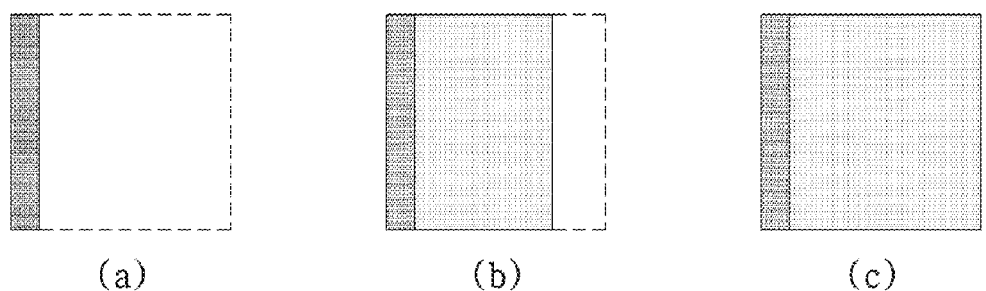
FIG. 1 illustrates examples of a downlink transmit time interval (TTI) according to the present disclosure.

Various examples will be described more fully hereinafter with reference to the accompanying drawings. Throughout the drawings and the detailed description, unless otherwise described, the same drawing reference numerals are understood to refer to the same elements, features, and structures.

In describing the examples, detailed description on known configurations or functions may be omitted for clarity and conciseness.

Further, the terms, such as first, second, A, B, (a), (h), and the like may be used herein, to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on." "directly connected to" or "directly coupled to" another element, there are no intervening elements present.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention. When an embodiment is embodied as software, the described scheme may be embodied as a module (process, function, or the like) that executes the described function. The module may be stored in a memory and may be executed by a processor. The memory may be disposed inside or outside the processor and may be connected to the processor through various well-known means.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B. eNodeB (eNB), gNodeB (gNB), and an access point (AP) Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

Hereinafter, examples of the present disclosure will be described, which relate to a frame structure supporting a control channel and a data channel, a method of assigning the control channel and the data channel, and a data channel scheduling method in a system (e.g., an NR system) supporting time domain areas within a single frequency domain area. For example, a single frequency domain area may correspond to a single component carrier (CC) and may correspond to a single cell. For example, time domain areas of different numerologies may correspond to predetermined time intervals (e.g., definable as subframes or transmit time intervals (TTIs)) each having a different length Hereinafter, various examples of the present disclosure will be described regarding a method of assigning, by a base station, a transmission resource for a control channel and a data channel to a terminal or a method of monitoring, by the terminal, and receiving the control channel and the data channel in the system supporting time domain areas of different numerologies within a single frequency domain area.

In the following description, a system to which various examples of the present disclosure are applied may be referred to as a New Radio (NR) system to be distinguished from other existing systems. However, the scope of the present disclosure is not limited thereto or restricted thereby. In addition, although the term 'NR system' is used herein as an example of a wireless communication system capable of supporting a variety of subcarrier spacings (SCSs), the term 'NR system' is not limited to the wireless communication system for supporting a plurality of subcarrier spacings.

Initially, a numerology used in the NR system is described.

An NR numerology may indicate a numerical value of a basic element or factor that generates a resource grid on a time-frequency domain for design of the NR system. As an example of a numerology of a 3rd Generation Partnership Project (3GPP) Long Term Evolution (LTE)/LTE-Advanced (LTE-A) system, a subcarrier spacing corresponds to 15 kilohertz (kHz) (or 7.5 kHz in the case of Multicast-Broadcast Single-Frequency Network (MBSFN)) and a normal Cyclic Prefix (CP) or an extended CP. Here, the meaning of the term 'numerology' does not restrictively indicate only the subcarrier spacing and includes a Cyclic Prefix (CP) length, a Transmit Time Interval (TTI) length, a number of Orthogonal Frequency Division Multiplexing (OFDM) symbols within a desired time interval, a duration of a single OFDM symbol, etc., associated with the subcarrier spacing (or determined based on the subcarrier spacing) That is, one numerology may be distinguished from another numerology based on at least one of the subcarrier spacing, the CP length, the TTI length, the number of OFDM symbols within the desired time interval, and the duration of the single OFDM symbol.

To meet the requirements of the program "International Mobile Telecommunication (IMT) for 2020 and beyond", the 3GPP NR system is currently considering a plurality of numerologies based on various scenarios, various service requirements, compatibility with a potential new system, and the like. In more detail, since current numerologies of wireless communication systems may not readily support, for example, a further higher frequency band, faster movement rate, and lower latency required in the program "IMT for 2020 and beyond", there is a need to define a new numerology.

For example, the NR system may support applications, such as enhanced Mobile Broadband (eMBB), massive Machine Type Communications/Ultra Machine Type Communications (mMTC/uMTC), and Ultra-Reliable and Low Latency Communications (URLLC) In particular, the requirements for user plane latency on the URLLC or eMBB service correspond to 0.5 ms in an upper link and 4 ms in all of the upper link and a down link A significant latency decrease is required compared to the latency of 10 ms required in the 3GPP LTE and LTE-A system.

To meet such various scenarios and various requirements in a single NR system, there is a need to support a flexible or scalable numerology (hereinafter, a scalable numerology)

To support a numerology of the NR system having scalability, values shown in Table 1 may be used.

TABLE 1

| Motivation | Scenarios | Subcarrier spacing | CP length | TTI length |
|---|---|---|---|---|
| Diverse service | eMBB | >=15 kHz | Depend on scenarios | Depend on scenarios |
| | Broadcast MBSFN transmission | <=15 kHz | Longer CP | Longer TTI |
| | mMTC | <=15 khz | Longer CP | Longer TTI |
| | URLLC | FFS | Depend on scenarios | Shorter TTI |
| Diverse deployment | Low to medium UE speed | 15 kHz | Depend on services | Depend on services |
| | High UE speed | >=60 kHz | Depend on services | Depend on services |
| | Fading channel | — | Depend on channel | — |
| | Multiple sites transmission | — | Longer CP | — |
| Diverse spectrum | Sub-6 GHz | Depend on scenarios | Depend on scenarios | Depend on scenarios |
| | Above 6 GHz | Larger carrier spacing | Shorter CP | Shorter TTI |
| Other services and deployments | Future scenarios | TBD, should ensure forward compatibility | TBD, should ensure forward compatibility | TBD, should ensure forward compatibility |

Referring to Table 1, the scalable numerology for the NR system may be applied to a subcarrier spacing, a cyclic prefix (CP) length, and a TTI length. However, it is provided as an example only and the scalable numerology may be applied to other targets.

Hereinafter, a method of deriving a plurality of scalable numerology values will be described.

Initially, there is a need to support more than one subcarrier spacing for the NR system. To this end, a specific subcarrier spacing value that is a base for deriving other subcarrier spacing values) may be defined, which is referred to as a base subcarrier spacing or a fundamental subcarrier spacing, and may be represented as $\Delta f0$. A set of the fundamental subcarrier spacing and other subcarrier spacings derived based thereon may be referred to as a single subcarrier spacing family. Here, a value of the fundamental subcarrier spacing $\Delta f0$ may be defined as, for example, a value corresponding to an integer multiple of 15 kHz or a value corresponding to an integer multiple of 17.5 kHz.

Also, the following two options may be considered as the numerology for the NR system. Option 1 may be an LTE-based numerology and option 2 may be a numerology of 2N symbols per millisecond (ins).

According to option 1, a number of orthogonal frequency division multiplexing (OFDM) symbols per ms may be $14*2^k$ (k=integer) and $\Delta f0=15$ kHz. For example, 7, 14, 28 . . . , etc., may be supported as the number of OFDM symbols per ins.

According to option 2, the number of OFDM symbols per ms may be $16*2^k$ (k=integer) and $\Delta f0=17.5$ kHz. For example, 8, 16, 32, . . . , etc., may be supported as the number of OFDM symbols per ms. In this case, the subcarrier spacing family (fsc) may be determined as a set of result values of exponentiation of 2 of the fundamental subcarrier spacing That is, $fsc=\Delta f0*2^m$ (m=integer). For example, if $\Delta f0=15$ kHz, fsc={15, 30, 60, . . . } Alternatively, it $\Delta f0=17.5$ kHz, fsc={17.5, 35, 70, . . . }.

Alternatively, fsc may be determined as a set of result values of integer multiples of the fundamental subcarrier spacing That is, fsc $\Delta f0*M$ (M=positive integer) For example, if $\Delta f0=15$ kHz and M=5. fsc={15, 75, 375, . . . }.

As described above, the range of values of the subcarrier spacing family may vary depending on a subcarrier spacing driving method. An appropriate subcarrier spacing deriving method may be applied based on a frequency position (e.g. 6 GHz or more) at which the NR system operates, a channel characteristic (e.g., doppler delay, delay spread), a characteristic and requirements of an application to be applied, and the like.

Hereinafter, various numerologies with respect to a time interval for the NR system will be described.

For describing the time interval, terms "TTI" and "NR subframe" are defined

The TTI refers to a time unit that is generated using one of various time scaling schemes. For example, the TTI may correspond to a single basic time unit that includes transmission of a control channel, a data channel, and a reference signal (RS). Here, the various time scaling schemes refer to various schemes for deriving different time lengths in a time domain by applying combinations of different NR numerologies (e.g., different subcarrier spacings, different OFDM symbol durations, different CP lengths, and different numbers of OFDM symbols). That is, the TTI may be configured using various numbers of OFDM symbols and various OFDM symbol lengths. The TTI may also be referred to as a term, such as a scheduling frame, to emphasize a functional meaning of the TTI.

The NR subframe refers to a time unit that is configured using a single TTI or a plurality of TTIs. For example, the NR subframe may correspond to a time unit that includes transmission of ACK/NACK feedback information associated with data information and control information as well as transmission of a control channel and a data channel That is, the NR subframe may correspond to a superset of the time unit.

Alternatively, the NR subframe may refer to a predetermined time interval that is used as the same time reference by all the terminals (including terminals based on a different numerology) within a cell That is, the NR subframe may be used in the NR system as a time reference having the absolutely same time interval (e.g., 1 ms) regardless of numerologies. For example, a time interval for transmitting common control information, a synchronization signal, and system information to all the terminals within a cell may be defined as the NR subframe. For example, the synchronization signal may be transmitted in subframe index numbers 0 and 5, and the system information may be transmitted and received based on a single subframe. Additionally, unicast data transmitted from the base station to each terminal, an RS, and control information (e.g., downlink control information (DCI), uplink control information (UCI)) may be transmitted based on not a subframe but in a time interval (e.g., slot). As described above, a time interval corresponding to a plurality of subframes, a time interval corresponding to a single subframe, or a time interval shorter than a subframe (e.g., corresponding to a slot) may be defined as the NR subframe.

As an example of various numerologies with respect to the time interval for the NR system, a length of a scalable time interval may be defined by applying a given subcarrier spacing (e.g., fixably applying a single subcarrier spacing, such as 15 kHz or 17.5 kHz), maintaining the same OFDM symbol duration, and assuming different numbers of OFDM symbols. Alternatively, a length of a single time interval may be defined using a different subcarrier spacing to adjust a time interval or using combination of a subcarrier spacing, the number of OFDM symbols, a CP length, and the like.

For example, when a fundamental subcarrier spacing of 15 kHz is applied, a TTI with a length of 1 ms and including 14 symbols, a scaled TTI (sTTI) with a length of 0.5 ms and including 7 symbols, and an sTTI with a length of 0.143 ms and including 2 symbols may be defined.

Alternatively, when a fundamental subcarrier spacing of 17.3 kHz is applied, a TTI with a length of 1 ms and including 16 symbols, an sTTI with a length of 0.5 ms and including 8 symbols, an sTTIi with a length of 0.25 ms and including 4 symbols, and an sTTI with a length of 0.125 ms and including 2 symbols may be defined.

Alternatively, regardless of a given CP length and subcarrier spacing, a single time interval (e.g., TTI or subframe) may include the same number of OFDM symbols. For example, with respect to both a case in which a 15 kHz subcarrier spacing is applied and a case in which a 30 kHz subcarrier spacing is applied with assuming overhead of a normal CP, a single time interval (e.g., TTI or subframe) may be configured using the same number of OFDM symbols. Here, when it is assumed that a single time interval is configured using the same 14 symbols with respect to both cases, the time interval may be configured to have a length of 1 ms with respect to the case in which the 15 kHz subcarrier spacing is applied and to have a length of 0.5 ms with respect to the case in which the 30 kHz subcarrier spacing is applied.

A plurality of time intervals may be defined using a plurality of subcarrier spacings. Description related thereto will be made with reference to FIGS. 1 and 2.

Figure 2:
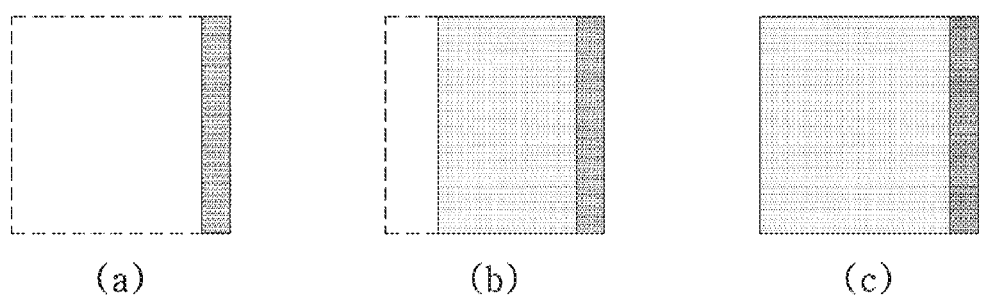
FIG. 2 illustrates examples of an uplink TTI according to the present disclosure.

FIG. 1 illustrates examples of a downlink TTI according to the present disclosure. FIG. 2 illustrates examples of an uplink TTI according to the present disclosure.

As shown in examples (a), (b), and (c) of FIG. 1, time intervals (e.g., TTIs) having different time lengths may be defined in a downlink (DL) and each TTI type may be used for transmission and reception of a control channel or a data channel.

The example (a) of FIG. 1 corresponds to DL TTI type 0, may be used for a DL common burst only, and may include 1 or 2 symbols.

The example (b) of FIG. 1 corresponds to DL TTI type 1, may be used for a DL common burst and a DL regular burst, and may include a partial TTI The DL common burst may correspond to a symbol in font of the DL regular burst based on temporal order.

The example (c) of FIG. 1 corresponds to DL TTI type 2, may be used for a DL common burst and a DL regular burst, and may include a full TTI. The DL common burst may correspond to a symbol in front of the DL regular burst based on temporal order.

As shown in examples (a), (b), and (c) of FIG. 2, time intervals (e.g., TTIs) having different lime lengths may be defined in an uplink (UL) and each TTI type may be used for transmission and reception of a control channel or a data channel.

The example (a) of FIG. 2 corresponds to UL TTI type 0, may be used for a UL common burst, and may include 1 or 2 symbols.

The example (b) of FIG. 2 corresponds to UL TTI type 1, may be used for a UL common burst and a UL regular burst, and may include a partial TTI. The UL common burst may correspond to a symbol behind the UL regular burst based on temporal order.

The example (c) of FIG. 2 corresponds to UL TTI type 2, may be used for a UL common burst and a UL regular burst, and may include a full TTI The UL common burst may correspond to a symbol behind the UL regular burst based on temporal order.

As described above, a single time interval (e.g., subframe) may be configured using one or a plurality of DL TTIs or UL TTIs and a guard interval (e.g., switching time between DL and LIL). For example, either DL TTI(s) or UL TTI(s) may be present in a single subframe. Alternatively, all of the DL TTI(s), the UL TTI(s), and the guard interval may be present in the single subframe From DL perspective, resource assignment and scheduling information (e.g., DL gram) for indicating data transmission (e.g., unicast data transmission) to be transmitted to each terminal, data transmission according thereto, and UCI (e.g., Hybrid Automatic Retransmission reQuest (HARQ)-ACK) transmission of a terminal corresponding to the data transmission may be performed within a single time interval. In this case, a timing between a DL grant transmission and a DL data transmission, a UCI transmission timing between DL data and a terminal corresponding thereto, or a timing between transmission of information requesting channel state information (CSI) report/sounding RS (SRS) within the DL grant and transmission of a response (e.g., CSI or SRS) of a terminal corresponding thereto may be semi-statically set using radio resource control (RRC) signaling or dynamically indicated using DCI to a corresponding terminal by the base station. Herein, a TTI index value may be used to indicate a timing. For example, if the DL grant is received in TTI index 0 and a timing for DL data transmission is indicated as TTI index 4 by the base station, a corresponding terminal may expect data reception in the corresponding TTI index 4. This operation may be performed based on a TTI index within a single subframe. If the above transmission and reception timing between the base station and the terminal is indicated and set based on a plurality of subframes, a timing related operation may be defined based on an TTI index within the plurality of subframes.

From UL perspective, all of resource assignment and scheduling (e.g., UL grant) by the base station, transmission and UL data transmission of a terminal corresponding thereto, and a feedback transmission by the base station may be performed within a single time interval (e.g., subframe). Likewise, a timing between a UI, grant transmission and a UL transmission of a terminal corresponding thereto, or a timing between a UL transmission of the terminal and transmission of a response (e.g., HARQ-ACK) of the base station corresponding thereto may be semi-statically set or dynamically indicated using DCI by the base station, which is similar to the DL.

Basically, a plurality of sTTIs may be defined based on a single NR subcarrier spacing. In this case, each of the plurality of sTTIs may have a different number of OFDM symbols or CP length. Alternatively, the plurality of sills may be defined based on the plurality of NR subcarrier spacings. In this case, the plurality of sTTIs may have the same number of OFDM symbols or CP length, and may also have different number of OFDM symbols or CP lengths.

The aforementioned NR numerology requires supporting more than one subcarrier spacing and may use a method of applying an integer multiple to a fundamental subcarrier spacing value using a scheme of deriving subcarrier spacing values. Detailed examples associated therewith may consider i) subcarrier spacing values including a 15 kHz subcarrier spacing, ii) subcarrier spacing values applying a uniform symbol duration including a CP length and including a 17.5 kHz subcarrier spacing, iii) subcarrier spacing values applying a uniform symbol duration including a CP length and including a 17.06 kHz subcarrier spacing, and iv) subcarrier spacing values including a 21.33 kHz subcarrier spacing. They are provided as examples only and are not to exclude other examples. In the above examples, it is defined that all of the subcarrier spacing values are derived from a specific fundamental subcarrier spacing value (i.e., $\Delta f0$)). Here, a scaling scheme of applying 14 ununiform symbols per TTI (or ms) may be applied for above i), and a scheme of applying $2^m$ uniform symbols per TTI (or ms) may be applied for above ii), iii), and iv).

Also, if an ununiform symbol duration (including a CP) is supported in the NR system, there is a need to align a scaled symbol boundary. For example, if $\Delta f1=2*\Delta f0$, a boundary of every 2 symbols according to $\Delta f1$ numerology may be defined to be aligned with a single symbol boundary according to $\Delta f0$ numerology. Alternatively, a scaled symbol boundary may be allowed not to be aligned. Alternatively, although the scaled symbol boundary is not aligned, a subframe boundary may be defined to be aligned.

Also, a plurality of OFDM numerologies applicable to the same frequency domain may be defined. For example, a plurality of numerologies may be applied to the same carrier (or component carrier). In this case, a method of multiplexing the plurality of numerologies needs to be defined.

Also, a boundary between TTIs according to different numerologies may be defined.

For example, to align a boundary between a TTI (or subframe) and an sTTI (or short subframe), i) if a TTI with a length of 0 Sins includes 8 symbols based on $\Delta f0$, a TTI with a length of 0.25 ms may maintain the same $\Delta f0$ and may include a scaled number of symbols (i.e., 4 symbols), and ii) if the TTI with the length of 0.5 ms includes 8 symbols based on $\Delta f0$, the TTI with the length of 0.25 ms may maintain the number of symbols (i.e., 8 symbols) based on $\Delta f1$ scaled from $\Delta f0$. Also, iii) It the TTI with the length of 0.5 ms includes 7 symbols based on $\Delta f0$ (e.g., 15 kHz), the TTI with the length of 0.25 ms may maintain the number of symbols (i.e., 7 symbols) based on MI (e.g., 30 kHz) scaled from $\Delta f0$. Here, a CP length of a first OFDM symbol is greater than other CP lengths by 15 Ts (15 samples, is $=1/2048*\Delta f$) based on a time of 0.5 ms, among subcarrier spacings of 15 kHz or more. In this manner, a boundary between Ms (=slots) based on different numerologies may match. Even in this case, matching or not matching a TTI boundary according to the above scheme i) and a TTI boundary according to the above scheme ii) may be allowed within the same carrier in which different numerologies are present Also, according to the NR scalable numerology, a subcarrier spacing and a CP length may be scaled together to cope with spread of a further long delay. To this end, at least one extended CP may be additionally applied in addition to a normal CP and an extended CP defined in a 3 GPP LTE/LTE-A system.

According to the aforementioned NR numerology scheme, an NR numerology to be selected and applied may be determined by a network (e.g., base station). Also, a configuration based on a different numerology value may be provided to each terminal. Also, configurations based on a plurality of numerology values may be provided to a single terminal.

Herein, proposed are a frame structure for supporting a control channel and a data channel and a method of assigning the control channel and the data channel based on the assumption that various numerologies are defined in the NR system. That is, the examples disclosed herein may simply presume that various numerologies are applied and are not limited to or restricted by a specific value of such a numerology. Also, the frame structure for supporting the control channel and the data channel and the method of assigning the control channel and the data channel according to the examples of the present disclosure will be described based on numerology family candidates for the NR system. However, the scope of the present disclosure is not limited to or restricted by a specific value of such a numerology.

In the following description, the control channel in the NR system is referred to as a New Radio Control Channel (NRCCH) and the data channel is referred to as a New Radio Shared Channel (NRSCH). Control information provided from the base station to a terminal through the NRCCH may be referred to as Downlink Control Information (DCI). For example, the DCI may include scheduling information or resource assignment information for transmission of the NRSCH Also, a reference signal used for demodulation of the NRCCH and/or NRSCH is referred to as a New Radio Reference Signal (NRRS).

Also, a prefix "s" used herein indicates a scaled form of a numerology that is derived based on a fundamental subcarrier spacing ($\Delta f0$) or a scaled form based on a number of symbols with respect to a numerology based on a subcarrier spacing family (fsc) that is derived based on the fundamental subcarrier spacing ($\Delta f0$) For example, sNRCCH may indicate a scaled control channel according to a numerology (e.g., $\Delta f1$) that is derived based on the fundamental subcarrier spacing ($\Delta f0$)

Also, control information may include UE-specific control information and common control information.

Also, data may include UE-specific data (e.g., unicast NRSCH similar to a Physical Downlink Shared Channel (PDSCH) or a Physical Uplink Shared Channel (PUSCH) in 3GPP LIE/LTE-A) and common data (e.g., broadcast NRSCH similar to a system information block (SIB) in 3GPP LTE/LTE-A) Although the present disclosure is described mainly based on an example of the unicast NRSCH, the scope of the present disclosure is not limited thereto and the examples may be applied to transmission and reception of the broadcast NRSCH. The broadcast NRSCH may be transmitted based on the same time reference that all of the terminals may be aware of. Thus, the broadcast NRSCH may be transmitted based on not all of time intervals corresponding to different numerologies (e.g., sTTIs) assumed by the respective terminals, but a single time interval (e.g., subframe) that puts together all of the time intervals.

Also, the NRCCH and the NRSCH may be assigned within the same TTI Similar thereto, an sNRCCH and an sNRSCH may be assigned within the same sTTI Alternatively, the sNRCCH and the sNRSCH may be assigned to different TTI indices, such that transmission and reception may be performed based on a data transmission timing associated with the aforementioned control information Such operations may be configured or indicated by the base station and then performed. Here, a TTI (i.e., unsealed TTI) corresponds to a TTI that is configured based on a fundamental subcarrier spacing and a number of fundamental OFDM symbols. Also, an sTTI (i.e., scaled TTI) corresponds to a TTI that is configured based on an unscaled TTI and based on a scaled subcarrier spacing and/or a scaled number of OFDM symbols. As described above, a variety of methods may be employed to configure different TTI lengths. Accordingly, the scaled TTI may be configured using one oldie methods.

The examples of the present disclosure relate to, assuming a terminal having capability of performing multi-TTI data transmission and reception in the same frequency domain (e.g., the same carrier or the same component carrier), a method of transmitting control information and assigning data resources associated with the control information to the terminal.

Also, the base station may set to terminals such that multi-TTIs based on different numerologies may be associated with different bandwidth parts thereinafter. BPs) within a single component carrier. That is, one or more BPs may be set to a terminal within a single component carrier. The terminal may perform a BP configuration on a bandwidth of a BP less than or equal to a maximum bandwidth capability supported by the terminal A single BP includes continuous PRBs. Also, the bandwidth of the BP is greater than or equal to a bandwidth for synchronization signal (SS) block transmission that includes a broadcast channel (NR-PBCH. PBCH) and a primary synchronization signal (PSS)/secondary synchronization signal (SSS) that is an NR synchronization signal. An SS block may be present or absent in a single BP depending on settings of the base station A single BP may be set to include:

numerology (i.e., subcarrier spacing, CP length, number of OFDM symbols per slot),
frequency location (i.e., center frequency of BP); and
BW (number of PRBs).

The base station may set an available BP to the terminal through RRC signaling for RRC connected mode UE By setting a numerology for a single BP as above, each BP is set based on a unique numerology. Accordingly, the multi-TTIs defined based on the plurality of numerologies may be set to the terminal by the base station by setting an independent numerology for each BP The terminal expects that at least one DL BP and UL BP among the plurality of set BPs may be activated (scheduled/received) in a specific time. In the activated DL/UL BP, the terminal excepts transmission and reception of PDCCH/PDSCH and/or PUSCH/PUCCH.

The following multi-TTI scheduling method is proposed as a scheduling method for a terminal based on the aforementioned different numerologies. The scheduling method may be applied to, for example, the terminal to which the plurality of BPs is set.

Initially, an example of a control channel design for an NR system according to the present disclosure is described. In detail, a method of assigning resources of a control channel for NR DL is described.

Herein, a method of assigning a control channel and scheduling data with respect to a terminal supporting scheduling in a multi-TTI is defined Hereinafter, a scheduling method in which a base station provides control information to a terminal and assigns resources for data transmission when a plurality of TTIs have different TTI lengths thereinafter, mixed multi-TTI), not when the plurality of TTIs have the same TTI length and the same number of OFDM symbols, will be described. A method for the plurality of TTIs to have different TTI lengths may configure and define a single TTI length by combining a subcarrier spacings, the number of OFDM symbols, and a CP length to be same or different.

Embodiment 1

Embodiment 1 relates to a multi-TTI data scheduling method for a terminal having capability of setting a mixed multi-TTI or performing transmission and reception in the mixed multi-TTI.

In the case of configuring a plurality of TTI lengths based on a plurality of numerologies, an NR terminal refers to a terminal having capability of supporting data transmission and reception during the same time in a physical resource area in a structure in which one or more TTI lengths differ from each other based on the plurality of numerologies. That is, the NR terminal has capability of supporting a mixed multi-TTI transmission scheme in a specific time interval and the NR terminal reports to an NR base station about the terminal capability of supporting a mixed multi-TTI operation. The NR base station may provide data scheduling and related configurations to the corresponding NR terminal based on the capability of the NR terminal.

Also, the NR base station may set a numerology to the NR terminal as follows

A single NR subframe may include a single TTI or a plurality of TTIs. FIGS. 3 to 10 illustrate examples in which a single NR subframe includes 2 sTTIs, sTTI #0 and sTTI #1 Here, it is assumed that sTTI #0 refers to a longer TTI and sTTI #1 refers to a shorter TTI. Also, sTTI #0 may be referred to as a first type sTTI and sTTI #1 may be referred to as a second type sTTI sTTI #0 may have a time length of 0.5 ms and may include 8 OFDM symbols based on a 17.5 kHz subcarrier spacing That is, sTTI #0 may be expressed to have a length of 62.54 μs per symbol in the 17.5 kHz subcarrier spacing. For example, it is assumed that a control area for sTTI #0 is indicated or set using a single OFDM symbol. That is, it is assumed that an NRCCH is transmitted with an NRRS for demodulation of the NRCCH within a single OFDM symbol Basically, the NRCCH may be present in a common area (or a cell-specific area) set for the base station to provide common control information (e.g., SIB) to a plurality of terminals. Alternatively, the NRCCH may be present in a UE-specific area set for UE-specific data transmission. In this case, control information for NRSCH demodulation may be carried Unless the NRCCH is transmitted in the UE-specific area, the base station may transmit the NRSCH in the corresponding area. For example, when resource assignment for data transmission is set or indicated in another TTI depending on a mixed-TTI scheduling method or a cross-TTI scheduling method described herein, the NRCCH transmission may not be included in a specific TTI.

sTTI #1 may have a time length of 62.54 μs and may include 2 OFDM symbols based on a 35 kHz subcarrier spacing. That is, sTTI #1 may be expressed to have a length of 31.27 its per slot in the 35 kHz subcarrier spacing. For example, similar to sTTI #0, sTTI #1 corresponds to a resource area that includes transmission of at least one of the NRCCH, the NRSCH, and the NRRS Accordingly, the same description related to sTTI #0 may be applied to sTTI #1 aside from the TTI time length and/or the number of OFDM symbols constituting a single TTI Although the following examples are described with assuming a numerology for sTTI #0 and sTTI #1 as above, it is provided for clarity of description. Accordingly, the scope of the present disclosure is not restricted by such a specific numerology and the examples disclosed herein may be applied to any numerology in which a scalability relationship is established between different sills.

The following Table 2 and Table 3 show a portion of examples of various NR numerologies. Although the examples of the present disclosure are based on numerology #0, numerology #1, and numerology #2, other various numerologies not disclosed in Table 2 and Table 3 may be applied.

scheduling method described above is referred to as a mixed-TTI scheduling method.

The mixed-TTI scheduling method may indicate NRSCH transmission within a longer TTI as well as NRSCH transmission within a shorter TTI using an NRCCH (e.g., DCI #0) transmitted in the shorter TTI. Likewise, the mixed-TTI scheduling method may indicate NRSCH transmission within the shorter TTI as well as NRSCH transmission within the longer TTI using an NRCCH (e.g., DCI #1) transmitted in the longer TTI Additionally, NRSCH transmission in the shorter TTI and/or longer TTI may be indicated through a combination of the NRCCH (e.g., DCI #0) transmitted in the shorter TTI and the NRCCH (e.g., DCI #1) transmitted in the longer TTI

TABLE 2

|  | Numerology #0 | Numerology #1 | Numerology #2 | Numerology #3 | Numerology #4 | Numerology #5 |
|---|---|---|---|---|---|---|
| Subcarrier spacing | 17.5 kHz | 17.5 kHz | 35 kHz | 15 kHz | 75 kHz | 375 kHz |
| OFDM symbol duration, no CP (μs) | 62.54 | 62.54 | 31.27 | 66.67 | 13.33 | 2.67 |
| CP duration (μs) | 5.4 | 5.4 | 27 | 4.7 | 0.95 | 0.19 |
| CP overhead (%) | 8.6 | 8.6 | 8.6 | 7 | 7 | 7 |
| Symbols per TTI | 16 | 8 | 2 | 14 | 14 | 35 |
| TTI duration | 1 ms | 0.5 ms | 67.94 μs | 1 ms | 0.2 ms | 0.1 ms |

TABLE 3

|  | Numerology #0 | Numerology #1 | Numerology #2 | Numerology #3 | Numerology #4 |
|---|---|---|---|---|---|
| Subcarrier spacing | 15 KHz | 30 kHz | 60 kHz | 120 KHz | 240 kHz |
| Symbols per TTI (slot) | 7 or 14 | 7 or 14 | 7 or 14 | 14 | 14 |
| TTI (slot) duration | 1 ms (14 symbols) 0.5 ms (7 symbols) | 0.5 ms (14 symbols) 0.25 ms (7 symbols) | 0.25 ms (14 symbols) 0.125 ms (7 symbols) | 0.125 ms (14 symbols) 0.0625 ms (7 symbols) | 0.0625 ms (14 symbols) 0.03125 ms (7 symbols) |

Through each sTTI assumed as above, the NRCCH may be transmitted with the NRRS per sTTI and the NRCCH may indicate NRSCH resource assignment and control information. For example, the NRCCH transmitted in sTTI #0 may include information indicating a transmission resource of the NRSCH transmitted in the same sTTI #0. Likewise, the NRCCH transmitted in sTTI #1 may include information indicating a transmission resource of the NRSCH transmitted in the same sTTI #1. If a mixed multi-TTI operation is set to the terminal by the NR base station, data may be transmitted to the terminal through a physical resource having a plurality of TTI lengths.

For example, a first symbol of first sTTI #0 may be used for transmission of the NRCCH (or sNRCCH), and an NRSCH (or sNRSCH) transmission resource of sTTI #0 and/or sTTI #1 may be indicated using the NRCCH. The In more detail, when the longer TTI is a DCI monitoring TTI, scheduling data of the longer TTI based on DCI of the longer TTI may correspond to self-TTI scheduling and data may be assigned to a physical resource corresponding to the same TTI length as that of a TTI in which the DCI is received. When the longer TTI is the DCI monitoring TTI, scheduling data of the shorter TTI based on DCI of the longer TTI may correspond to mixed-TTI scheduling and data may be assigned to a physical resource corresponding to a TTI length different from that of the TTI in which the DCI is received. When the longer TTI is the DCI monitoring TTI, scheduling data of the shorter TTI and the longer TTI based on DCI of the longer TTI may correspond to mixed-TTI scheduling and data may be assigned to the physical resource corresponding to the same TTI length as that of the TTI in which the DCI is received and the physical resource corresponding to the TTI length different from that of the TTI in which the DCI is received.

Also, when the shorter TTI is a DCI monitoring TTI, scheduling data of the shorter TTI based on DCI of the shorter TTI may correspond to self-TTI scheduling and data may be assigned to a physical resource corresponding to the same TTI length as that of a TTI in which the DCI is received. When the shorter TTI is the DCI monitoring TTI, scheduling data of the longer TTI based on DCI of the shorter TTI may correspond to mixed-TTI scheduling and data may be assigned to a physical resource corresponding to a TTI length different from that of a TTI in which the DCI is received. When the shorter TTI is the DCI monitoring TTI, scheduling data of the shorter TTI and the longer TTI based on DCI of the shorter TTI may correspond to mixed-TTI scheduling and data may be assigned to the physical resource corresponding to the same TTI length as that of the TTI in which the DCI is received and the physical resource corresponding to the TTI length different from that of the TTI in which the DCI is received.

Also, when all of the longer TTI and the shorter TTI are DCI monitoring TTIs, scheduling data of the longer TTI through a combination of DCI of the longer TTI and DCI of the shorter TTI may correspond to self and cross-TTI scheduling. When all of the longer TTI and the shorter TTI are DCI monitoring TTIs, scheduling data of the shorter TTI through a combination of DCI of the longer TTI and DCI of the shorter TTI may correspond to self and cross-TTI scheduling. When all of the longer TTI and the shorter TTI are DCI monitoring TTIs, scheduling data of the longer III and data of the shorter TTI through a combination of DCI of the longer TTI and DCI of the shorter TTI may correspond to self and cross-TTI scheduling.

As described above, self-TTI scheduling, mixed-TTI scheduling, or cross-TTI scheduling may be performed on resources having different TTI lengths based on different numerologies. Although the following examples of the present disclosure are described based on a case in which control information (or NRCCH or DCI) is present generally on a resource of the longer TTI and data (or NRSCH) transmission is assigned in the longer TTI and/or the shorter TTI based on the control information, the scope of the present disclosure is not limited thereto. The examples may be applied to a case in which control information (or NRCCH or DCI) is present on a resource of the shorter TTI and data (or NRSCH) transmission is assigned in the longer TTI and/or shorter TTI based on the shorter TTI In examples of FIGS. 3 to 10, it is assumed that a single DL NR subframe corresponds to a 17.5 kHz subcarrier spacing (SS), 16 symbols, and a time length of 1 ms. Also, it is assumed that sTTI #0 corresponds to the 17.5 kHz SS, 8 symbols, and the time length of 0.5 ms, and sTTI #1 corresponds to a 35 kHz SS, 2 symbols, and a time length of 67.94 μs. Also, it is assumed that sTTI #0 and sTTI #1 correspond to different frequency domain areas within an allocated frequency bandwidth (allocated BW) (e.g., a single carrier or a single component carrier). Examples of FIGS. 9 and 10 include a case in which sTTI #0 and sTTI #1 are present in different frequency domain areas and different time domain areas, and also include a case in which sTTI #0 and sTTI #1 are present in the same frequency domain area and different time domain areas.

The TTI, described herein, which is a time unit for transmitting a data signal and/or a control signal may refer to a time interval that is determined based on a numerology, as described above. The corresponding TTI may be replaced with a time unit, such as a number of OFDM symbols and a number of slots, and thereby defined. For example, the longer TTI may be represented using 8 OFDM symbols and the shorter TT) may be represented using 2 OFDM symbols. Also, depending on a numerology, the TTI may have the same time length as a slot and one or more slots may be used to constitute a single TTI.

Figure 3:
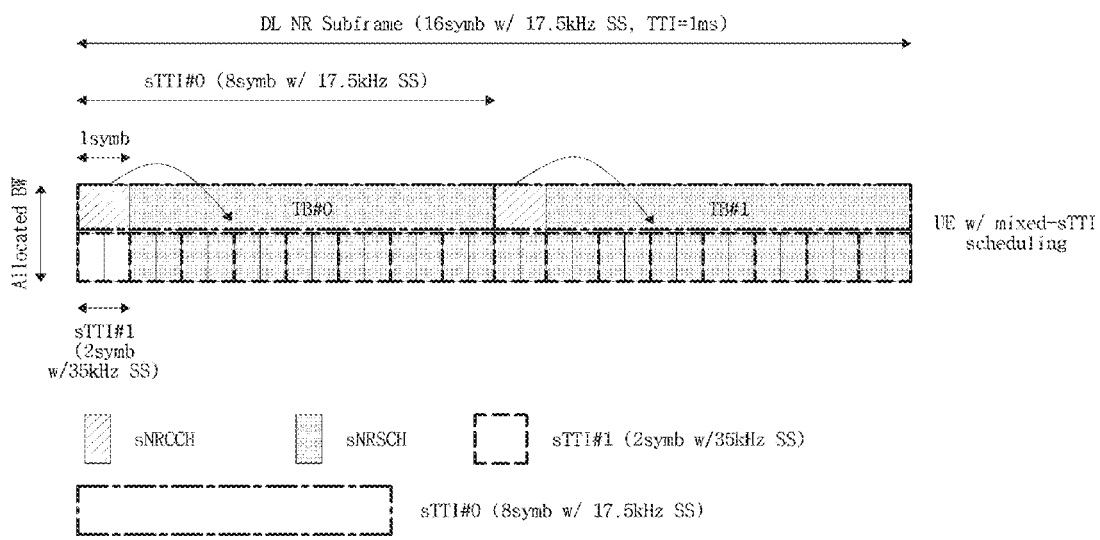
FIGS. 3 and 4 illustrate examples of mixed-TTI scheduling using a longer downlink control information (DCI) format for a single new radio (NR) terminal according to the present disclosure.
Figure 4:
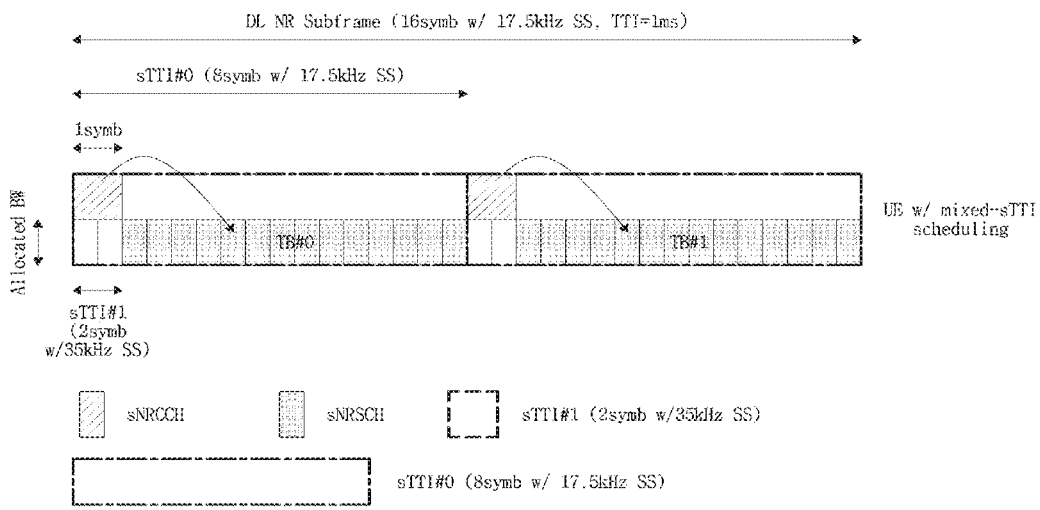

FIGS. 3 and 4 illustrate examples of mixed-TTI scheduling using a longer DCI format for a single NR terminal according to the present disclosure.

Referring to the example of FIG. 3, DCI of sNRCCH of first (left) sTTI #0 may provide resource assignment information for transmission of transmission block (TB) #0 of sNRSCH in the first sTTI #0 and second sTTI #1 to eighth sTTI #1 Also. DCI of sNRCCH of second (right) sTTI #0 may provide resource assignment information for TB #1 transmission of sNRSCH in second sTTI #0 and ninth sTTI #1 to sixteenth sTTI #1

In the example of FIG. 3, there is a difference between a scheduling method for the first sTTI #0 (i.e., sTTI #0 on the left of the figure) and a scheduling method for the second sTTI #0 (i.e., sTTI #0 on the right of the figure) In detail, the difference lies in presence or absence of data that is assigned in a time interval of sTTI #1 corresponding to an OFDM symbol duration that is a control area of sTTI #0 (i.e., a resource corresponding to the same time interval as that of sNRCCH of sTTI #0, however, corresponding to a different frequency band), when a data transmission resource in sTTI #1 is assigned using a mixed-TTI scheduling method based on transmitted control information in sTTI #0.

Whether a start position of a data assignment resource is a symbol immediately after an end position of a control area or whether the start position of the data assignment resource includes a symbol of a TTI boundary regardless of the end position of the control area may be determined based on processing capability of a corresponding terminal, a terminal category, and a data buffering performance. When the start position of the data assignment resources is irrelevant to the end position of the control area, the base station may indicate to the terminal information about start of a corresponding data assignment resource through control information (i.e., DCI in PDCCH) Also, a single terminal may be set by applying one of two schemes with respect to the above data transmission start position. The data transmission may start at a position after transmission of control information ends so that the terminal may perform operations required to receive data.

Referring to the example of FIG. 4. DCI of sNRCCH of first sTTI #0 may provide resource assignment information for TB #0 transmission of sNRSCH in second sTTI #1 to eighth sTTI #1. Also, DCI of sNRCCH of second sTTI #0 may provide resource assignment information for TB #1 transmission of sNRSCH in tenth sTTI #1 to sixteenth sTTI #1.

To support a data transmission resource assignment in the multi-TTI as shown in the examples of FIGS. 3 and 4, a new DCI format may be defined. In the case of indicating data scheduling within a shorter TTI based on a longer TTI time, data transmission resource assignment information for a longer TTI may be applied to a shorter TTI resource area. For example, the base station may semi-statically preset to the terminal regarding whether to perform data transmission and reception in physical resources (e.g., bandwidth parts) corresponding to N different TTI durations through upper layer (e.g., radio resource control (RRC)) signaling A size of the entire DCI format (i.e., a number of bits) may be determined based on the presetting. A physical resource corresponding to a TTI duration in which data assignment is to be potentially performed may be set based on the presetting and the base station may schedule a specific time/frequency resource among such indicated physical resources to the terminal for the final data assignment. Hereinafter, all the scheduling methods proposed herein are performed based on the aforementioned procedure. The following Table 4 represents a new DCI format according to the present disclosure. For example, it is assumed that a time interval, that is, a duration corresponding to 2 (N=2) TTI lengths (e.g., longer TTI and shorter TTI) is set to the terminal.

TABLE 4

TIF
RA
MCS
NDI
RV
HARQ process ID
TPC
Etc

Referring to Table 4, the field "TIF" represents a TTI indicator field and may be included in DCI only with respect to a terminal to which a multi-TTI operation is set. If a mixed multi-TTI operation is set (i.e., if each physical resource area (e.g., BP) corresponding to the multi-TTI is set), the base station may indicate to the terminal a physical resource area corresponding to a TTI in which data transmission is to be scheduled using the field "TIF".

For example, a value of the field "TIF" may be preset by the NR, base station to correspond to a single TTI length. For example, if TIF is defined as a 1-bit size and if TIF value=0, it may indicate setting of TTI index #0 (e.g., sTTI #0 or BP #0). If TIF value=1, it may indicate setting of TTI index #1 (e.g., sTTI #1 or BP #1)

It TIF is defined as a 2-bit size and if TIF value=00, it may indicate setting of TTI index #0 (e.g., sTTI #0 or BP #0). If TIE value=01, it may indicate setting of TTI index #1 (e.g., sTTI #1 or BP #1), if TIF value=10, it may indicate setting of all of TTI index #0 and TTI index #1 (e.g., sTTI #0 (BP #0) and sTTI #1 (BP #1)) If TIE value=11, it may indicate absence of data scheduling or another purpose, such as, for example, release of semi-persistent scheduling (SPS), and DL data non-assignment Transmit Power Control (TPC). Alternatively, if TIF value=11, scheduling may be reserved.

Referring again to Table 4, Resource Assignment (RA) may indicate a frequency resource assigned for data transmission. *The field "RA" indicates a physical resource area for data reception within a physical resource area (e.g., BP) that is indicated using the TIF value among the set TTIs. Also, fields "MCS" representing modulation and coding scheme. NDI representing a new data indicator, and RV representing a redundancy version may be provided per TB/code block (CB)/code block group (CBG). Additionally, control information of HARQ process ID and TPC may be included. Further, as control information indicated with Etc, control information, for example, A/N resource offset. UL sounding RS request, and CSI request, may be further included. The aforementioned control information, such as, for example, RA, MCS, NDI, RV, HARQ process ID, TPC, and Etc. may be provided independently (i.e., independent DCI fields are applied for data scheduling within physical resource areas corresponding to different TTIs) per TTI configuration depending on a resource assignment method, and may be provided commonly (i.e., a common DCI field is applied for data scheduling within physical resource areas corresponding to different TTIs) for data scheduling within physical resource areas for a plurality of TTI configurations.

According to an additional embodiment, the base station may set the terminal to monitor a control area of a physical resource area (e.g., a physical area in which a PDCCH including DCI may be transmitted) corresponding to a specific TTI Therefore, the control area of the physical resource area corresponding to the specific TTI for PDCCH monitoring may be set to the terminal by the base station through upper layer signaling (e.g., RRC signaling). Also, data transmission may be scheduled not in the physical resource area corresponding to the specific TTI for PDCCH monitoring but in a physical resource area corresponding to another TTI this operation may be considered as one of methods for cross TTI-scheduling.

Figure 5:
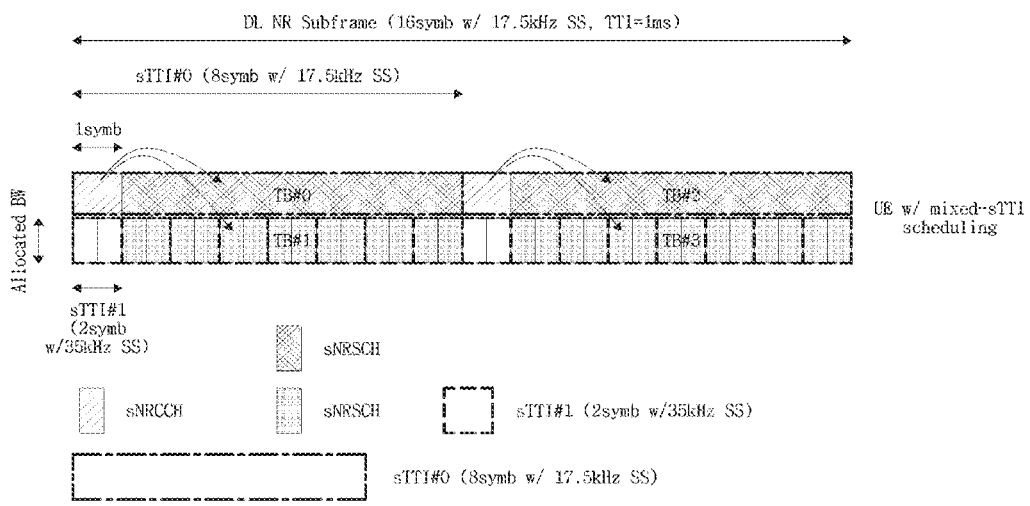
FIG. 5 illustrates another example of mixed-TTI scheduling using a longer DCI format for a single NR terminal according to the present disclosure.

FIG. 5 illustrates another example of mixed-TTI scheduling using a longer DC format for a single NR terminal according to the present disclosure.

Referring to the example of FIG. 5, DCI of sNRCCH of first (left) sTTI #f) may provide resource assignment information for TB #0 transmission of sNRSCH in the first (left) sTTI #1) and resource assignment information for TB #1 transmission of sNRSCH in second sTTI #1 to eighth sTTI #1 Also, DCI of sNRCCH of second fright) sTTI #0 may provide resource assignment information for TB #2 transmission of sNRSCH in the second sTTI #0 and resource assignment of TB #3 transmission of sNRSCH in tenth sTTI #1 to eighteenth sTTI #1.

To support a data transmission resource assignment in a multi-TTI as shown in the example of FIG. 5, a new DCI format may be defined as shown in the following Table 5.

TABLE 5

| TIF | |
|---|---|
| TTI index#0 | RA |
| | MCS |
| | NDI |
| | RV |
| | HARQ process ID |
| . . . | . . . |
| TTI index#N − 1 | RA |
| | MCS |
| | NDI |
| | RV |
| | HARQ process ID |
| TPC | |
| Etc | |

The field "TIF" of Table 5 is identical to that of Table 4 and a further description related thereto is omitted.

In the example of Table 5, RA, MCS, NDI, RV, and HARQ process ID information may be provided with respect to each of N TTI indices. As described above, control information of TPC and Etc. (e.g., A/N resource offset. UL sounding RS request, CSI request) may be commonly applied with respect to the plurality of TTIs.

As a modified example of the example of Table 5, MCS may be provided as common information for the plurality of TTIs, instead of being provided for each TTI index. That is, the same MCS may be applied with respect to data that is transmitted in the plurality of TTIs.

Also, to reduce an increase in overhead by control information fields defined for each of the TTI indices, joint encoding may be applied or may be defined as a combinational field. For example, joint encoding for a plurality of pieces of control information (e.g., RV, NDI, HARQ process ID) may be defined as shown in the following Table 6 This scheme may lower the flexibility of setting a control information value, however, may reduce a size of control information

TABLE 6

| Joint field | TTI index#0 | TTI index#1 |
| --- | --- | --- |
| 00 | RV = 0, NDI = 0, HARQ process#0 | RV = 1, NDI = 0, HARQ process#0 |
| 01 | RV = 2, NDI = 0, HARQ process#1 | RV = 1, NDI = 0, HARQ process#3 |
| 10 | RV = 3, NDI = 0, HARQ process#5 | RV = 2, NDI = 0, HARQ process#2 |
| 11 | RV = 1, NDI = 1, HARQ process#6 | RV = 1, NDI = 0, HARQ process#7 |

Figure 6:
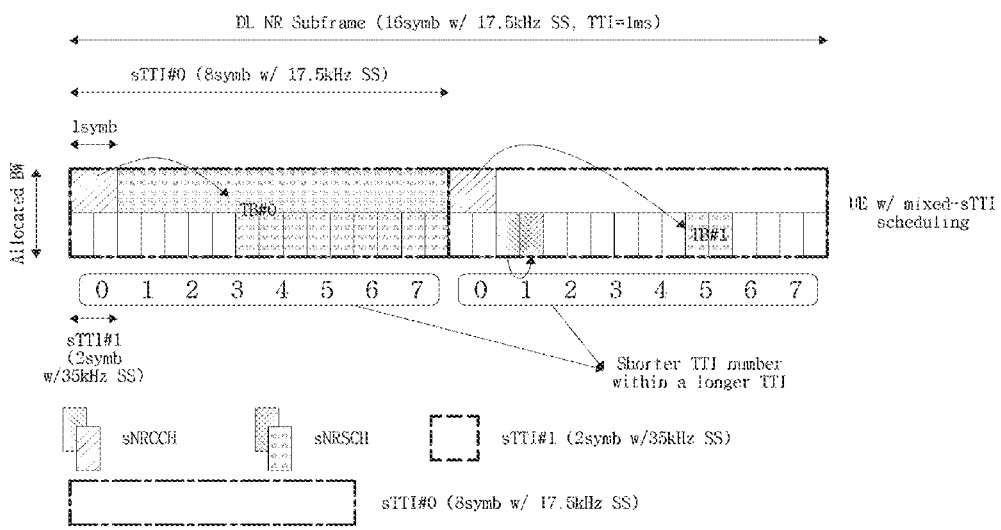
FIG. 6 illustrates another example of mixed-TTI scheduling using a longer DCI format for a single NR terminal according to the present disclosure.

FIG. 6 illustrates another example of mixed-TTI scheduling using a longer DC format for a single NR terminal according to the present disclosure Referring to the example of FIG. 6. DCI of sNRCCH of first (left) sTTI #0 may provide resource assignment information for TB #0 transmission of sNRSCH in the first sTTI #0 and fourth sTTI #1 to eighth sTTI #1. Also, DCI of sNRCCH of second sTTI #0 may provide resource assignment information for TB #1 transmission of sNRSCH in fourteenth sTTI #1. Also, sNRCCH of tenth sTTI #1 may provide resource assignment information for sNRSCH transmission in the corresponding tenth sTTI #1 Alternatively, a resource assignment start position for data assignment may be indicated based on OFDM symbol index values and/or slot index values instead of using a TTI unit. Therefore, in the example of FIG. 6, indication of a data resource area corresponding to sTTI #1 may correspond to indication of a start position, such as OFDM symbol indices #6 to #15 (TB #0) and OFDM symbol indices #10 and #11 (TB #1). An end position of the data resource area may be a boundary between TTIs or may be indicated in the same manner as the start position through DCI To support a data transmission resource assignment in the multi-ill as shown in the example of FIG. 6, a new DCI format may be defined as represented by the following Table 7

TABLE 7

TIF
RA
TTI Assignment (in Time domain) - scheduled TTI index or scheduled first TTI timing value (start/end position in time domain) or using OFDM/slot index for indicating start/end position in time domain
MCS
NDI
RV
HARQ process ID
TPC
Etc In the example of Table 7, TIF, RA, MCS, NDI, RV, HARQ process ID, TPC, Etc. (e.g., RV, NDI, and HARQ process ID information) is identical to those of Table 4 or Table 5 and a further description related thereto is omitted.

The example of Table 7 includes the field "TTI assignment" Dissimilar to the example of Table 4 or Table 5, the example of Table 7 further includes the field "TTI assignment" Therefore, data transmission may be scheduled based on a TTI index (or TTI number) in a different TTI length that is a target in order to schedule data in a resource area having the different TTI length. For example, a resource assignment resolution in a time domain for data transmission in a shorter TTI may be performed based on the shorter TTI, and the base station may indicate a longer TTI through NRCCH (DCI) transmitted in a control area within the longer TTI and may additionally indicate data transmission within the shorter TTI. If a time interval corresponding to the longer TTI is capable of being equally divided based on a time interval that constitutes the shorter TTI, shorter TTI indices may be assigned in temporal order as illustrated in FIG. 6, within a time interval corresponding to the longer TTI. For example, shorter TTI indices, 0, 1, . . . , 7, may be assigned within a time interval corresponding to a single longer TTI. Alternatively, as described above, to indicate a start position and an end position for data assignment within all of the longer TTI/shorter TTI, the base station may carry OFDM/slot symbol indices in DCI and may transmit the same to the terminal. Therefore, regardless of a physical area corresponding to the longer TTI/shorter TTI, the start position and the end position for data assignment may be indicated to the terminal by combining the start position and the end position for data assignment into a TTI unit, an OFDM symbol, and a slot unit through the DCI. Accordingly, resources may be further flexibly and efficiently used, which may lead to enhancing the frequency efficiency of the entire NR system.

As described above, when a single longer TTI corresponds to a plurality of shorter TTIs, indices may be assigned to the plurality of shorter TTIs within a single longer TTI.

Alternatively, if a time interval corresponding to an NR subframe is capable of being equally divided into time interval units that constitute the longer TTI, longer TTI indices may be assigned to the time units that are divided within the NR subframe. Likewise, if the time interval corresponding to the NR subframe is capable of being equally divided into time units that constitute the shorter TTI, shorter TTI indices may be assigned to the time units that are divided within the NR subframe. For example, referring to FIGS. 3 to 10, sTTI #0 indices, 0 and 1, corresponding to the longer TTI and sTTI #1 indices, 0, 1, . . . , 15, corresponding to the shorter TTI may be assigned to a single NR subframe based on the NR subframe. Hereinafter, description is made based on a method of assigning shorter TTI indices to a plurality of shorter TTIs corresponding to a single longer TTI based on the single longer TTI. Alternatively, as described above, a start position and an end position for data assignment may be indicated to the terminal through DCI based on a time unit, such as, an OFDM symbol index and a slot index within a resource area (e.g., BP) corresponding to each TTI. For example, referring to FIG. 6, in a resource area (e.g., BP #1) corresponding to sTTI #1, OFDM symbol index #6 (start position) and OFDM symbol index #15 (end position) may be indicated to the terminal through DCI. Also, the start position and the end position may be indicated by combining the OFDM symbol index #6 corresponding to the start position and a time length of 10 OFDM symbols.

Also, the field "TTI assignment" may be defined as a TTI number indication field. For example, when data transmission resources within the shorter TTI are indicated to the terminal through a control channel within the longer TTI, resource assignment in at least a time axis may be indicated using a TTI number Referring to the example of FIG. 6, when 8 shorter TTIs correspond to a single longer TTI, numbers 0, 1, . . . , 7 may be assigned to the shorter TTIs in temporal order and the base station may indicate to the terminal a shorter TTI within which a data transmission resource is to be assigned using the TTI number. For example, referring to the example of FIG. 6, for assigning data resources on the time axis within sTTI #1 corresponding to the first (left) sTTI #0 and to which numbers, 0 to 7, are assigned, numbers 3, 4, 5, 6, and 7 may be indicated to the terminal or a timing value associated with an index corresponding to first STTI #1 in consecutive sTTI #1 time intervals may be indicated. The timing may indicate that a data resource is assigned from an sTTI #1 index after a $k^{th}$ sTTI #1 index (e.g., k=3 in the case of corresponding to a time interval of the first sTTI #0 in FIG. 6) based on an sTTI #1 index (in FIG. 6, sTTI #1 index 0 corresponds to a 1 OFDM symbol that is an NRCCH transmission time interval within sTTI #0) corresponding to a time interval of NRCCH (DCI) that is transmitted in the longer TTI. Accordingly, the terminal may attempt to receive data and decode the received data in fourth sTTI #1 to eighth sTTI #1 within the NR subframe/slot. Also, referring again to the example of FIG. 6, for assigning data resources on the time axis within sTTI #1 corresponding to second (right) sTTI #0 and to which numbers, 0 to 7, are assigned, the number 5 may be indicated to the terminal. Alternatively, as described above, a data area corresponding to OFDM symbol indices #10 and 11 may be indicated through DCI using a time unit, such as art OFDM symbol index and a slot index. Alternatively, a resource may be assigned to the terminal by indicating k=5 based on a timing value k and a time at which the DCI is received. Accordingly, the terminal may attempt to receive data and decode the received data in the fourteenth sTTI #1 within the NR subframe.

Alternatively, the field "TTI assignment" may be defined as a blank TTI number indication field. The base station may indicate to the terminal that data resource assignment is absent in a time axis corresponding to a shorter TTI indicated by a blank TTI number That is, if the above example relates to indicating a TTI number in which data transmission is present, the present example relates to indicating a TTI number in which data transmission is absent. Alternatively, if a time unit, such as an OFDM symbol index/slot index, is considered, an indication of a blank time interval may be indicated to the terminal through DCI using a corresponding time unit. In a different frequency bandwidth (e.g., longer TTI) of the same time, data resource assignment may be present. For example, in the example of FIG. 6, numbers, 0, 1, and 2, may be indicated to the terminal to indicate that data resource assignment is absent on a time axis within sTTI #1 to which numbers, 0 to 7, corresponding to the first sTTI #0 are assigned. Accordingly, the terminal may be aware that data transmission is absent in the first sTTI #1 to third sTTI #1 within the NR subframe, and may attempt to receive and decode data in the fourth sTTI #1 to eighth sTTI #1 Also, in the example of FIG. 6, numbers, 0, 1, 2, 3, 4, 6, and 7, may be indicated to the terminal for data resource assignment on the time axis within sTTI #1 to which numbers, 0 to 7, corresponding to the second sTTI #0 are assigned. Accordingly, the terminal may be aware that data transmission is absent in the ninth sTTI #1 to thirteenth sTTI #1 and the fifteenth sTTI #1 and sixteenth sTTI #1 within the NR subframe and may attempt to receive and decode data in the fourteenth sTTI #1. As described above, the blank time interval may be indicated based on a time unit such as an OFDM symbol index and a slot index.

The blank TTI may be indicated by the base station to the terminal to perform clear channel assignment ICCA) of the NR system that operates in a non-licensed carrier in addition to performing the resource assignment That is, an apparatus that operates in the non-licensed carrier is required to verify whether another apparatus is using a channel prior to transmitting a signal, which may be referred to as a Listen-Before-Talk (LBT) operation. The blank TTI may be recognized as information indicating that data transmission is absent during a corresponding time interval. Therefore, the terminal that operates in the non-licensed carrier may perform CCA based on a time interval in which signal transmission from the base station is absent, using the blank TTI. When it is determined that signal transmission from the other apparatus is absent as a result of performing the CCA, that is, when the LBT succeeds, the terminal may perform uplink transmission in an UL TTI DCI including the aforementioned blank time interval (e.g., blank TTI, blank symbol, or blank slot) may be transmitted to a plurality of terminals through a common group PDCCH. Terminals receiving corresponding signaling do not assume any other operation in at least a corresponding blank time interval. Accordingly, from perspective of at least a corresponding terminal, how a corresponding blank time interval is to be actually used from perspective of a network may be unknown. Alternatively, for interference measurement or operation in the non-licensed serving cell, information on the blank time interval may be signaled to the corresponding terminal so that an operation of the corresponding terminal may be performed in the blank time interval As described above in the examples, the field "TTA assignment" (data area start and end indication field) may be configured using a bitmap, combinational index, and a starting point with length.

In the aforementioned examples, in a TTI (i.e., a TTI in which only data transmission is present) in which a resource used for control channel transmission is not required, a physical resource available for the control channel transmission may be used based on base station scheduling. According to the above method, the terminal performs demodulation of NRCCH based on a LIE-specific RS instead of performing the demodulation based on a cell-specific (or common) RS Accordingly, control channel transmission and data channel transmission may be further flexibly scheduled.

Figure 7:
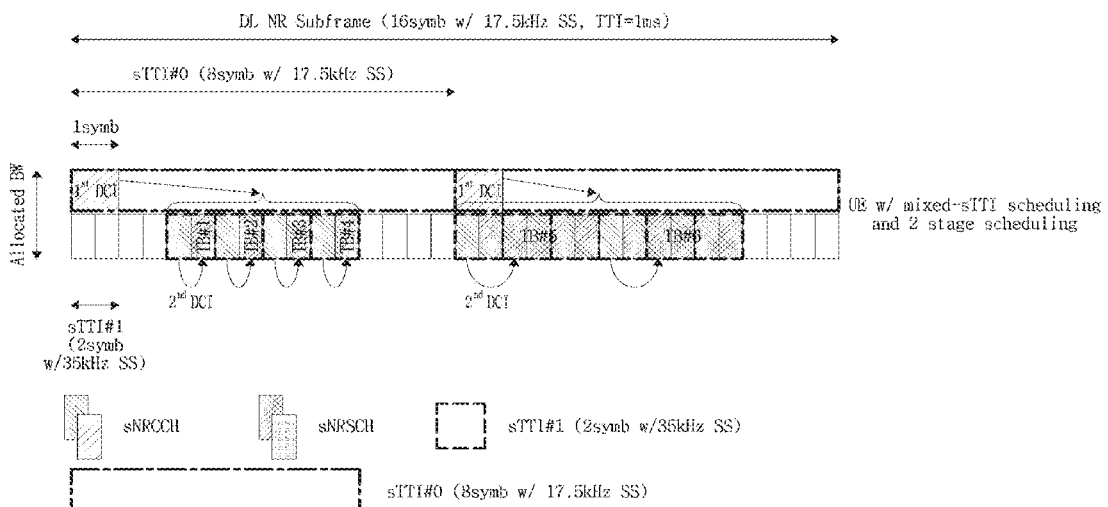
FIG. 7 illustrates an example of 2-stage DCI scheduling using a multi-TTI according to the present disclosure.

FIG. 7 illustrates an example of 2-stage DCI scheduling using a multi-TTI according to the present disclosure.

Referring to the example of FIG. 7, first type DCI of sNRCCH of first (left) sTTI #0 may indicate that third sTTI #1 to sixth sTTI #1 are candidate areas in which data transmission is possible Second type DCI transmitted from the third sTTI #1 to sixth sTTI #1 may provide resource assignment information for transmission of TB #1, TB #2, TB #3, and TB #4, respectively. Also, first type DCI of sNRCCH of second (right) sTTI #0 may indicate that ninth sTTI #1 to fourteenth sTTI #1 are candidate area in which data transmission is possible. Second type DCI of the ninth sTTI #1 may provide resource assignment information for transmission of TB #5 in ninth sTTI #1 to eleventh sTTI #1 and second type DCI of the twelfth sTTI #1 may provide resource assignment information for transmission of TB #6 in twelfth sTTI #1 to fourteenth sTTI #1.

In the example of FIG. 7, data resources may be assigned by combining a plurality of pieces of DCI transmitted in different TTIs. In the example of FIG. 7, it is assumed that there is no need to provide the terminal with semi-static signaling about a DCI monitoring TTI for cross-TTI scheduling, each data transmission is indicated within each corresponding TTI (i.e., self-TTI scheduling), and a different TB is transmitted in each TTI. Here, a 2-stage DCI scheduling method may be applied to efficiently transmit control information within the shorter TTI. That is, 2-stage DCI scheduling may be used for data resource assignment within a resource area corresponding to a specific TTI, among resource areas corresponding to different TTIs. The 2-stage DCI scheduling method may be applied within a resource area corresponding to the same TTI. Although the following description is made based on the 2-stage DCI scheduling method corresponding to different TTIs, it is provided as an example only and the present disclosure is not limited to such a configuration environment.

In more detail, as in the example of FIG. 7, control information, that is, DCI may be transmitted to indicate data resource assignment with each TTI within each corresponding TTI. Accordingly, the terminal may perform a monitoring operation (e.g., blind decoding) to receive the control information in each corresponding TTI. Herein, such operation is defined as a self-TTI scheduling method.

Also, a portion of control information for assigning a data transmission resource within a shorter TTI may be derived from DCI that is transmitted in a longer TTI. That is, it may correspond to 2-stage DCI scheduling in that resource assignment information for the data transmission is configured by combining DCI that is transmitted in the longer TTI and DCI that is transmitted in the shorter TTI. For example, for 2-stage DCI scheduling, two types of DCI formats may be configured as expressed by the following Table 8 and Table 9. Also, the proposed 2-stage DCI scheduling may be applied in a resource area corresponding to the same TTI.

TABLE 8

RA
TTI Assignment (in Time domain) - Scheduled TTI index or Scheduled first TTI timing value
MCS
TPC
Etc

TABLE 9

NDI
TIF
RV
HARQ process ID

Also, the DCI format of Table 8 corresponds to a format of the first type DCI that is transmitted in the longer TTI, and RA, TTI assignment. MCS. TPC, and Etc. (e.g., RV. NDI, HARQ process ID) are identical to those of Table 4, Table 5, and Table 7, and thus further description related thereto is omitted here. Here, the field "RA" may be present per TTI index depending on a resource assignment method. Although FIG. 7 illustrates an example of performing resource assignment in a frequency domain corresponding to sTTI #1 based on a time length of sTTI #1, resource assignment in the frequency domain using the field "RA" of Table 7 may be applied to resource assignment in a frequency domain corresponding to sTTI #0 based on a time length of sTTI #1

The DCI format of Table 9 corresponds to a format of the second type DCI that is transmitted in the shorter TTI, and NDI, TIF, RB, and HARQ process ID are identical to those of Table 4, Table 5, and Table 7, and thus further description related thereto is omitted here.

As described above, for scheduling data transmission in the shorter TT, modification may be performed slowly or control information not required to be modified may be transmitted through the first type DCI that is transmitted in the longer TTI. Only information required to transmit a different TB in each corresponding shorter TTI may be transmitted through the second type DCI that is transmitted in the shorter TTI. A control information field present in different DCI may be applied to be different from that of the example. Accordingly, the control information fields may be included in different DCI and thereby transmitted.

The aforementioned 2-stage scheduling method may significantly reduce overhead of control information for indicating data transmission per shorter TTI and may not significantly affect the performance. Accordingly, data transmission scheduling may be further efficiently performed in the shorter TTI. Also, due to a reduction in a size of DCI that is transmitted in the shorter. In link transmission performance may be further enhanced based on the same transmission power. The method of indicating data transmission may be applied to a scenario in which delay of data transmission through the shorter TTI is required, however, an actual physical channel environment does not greatly change.

Also, since indices for different TTIs in the same frequency domain are defined within DCI, cross-TTI scheduling corresponding to the same TTI numerology (e.g., shorter TTI), however, corresponding to the same TTI or different TTIs may be applied as shown in the example of FIG. 7. For example, a new DCI format may be defined as expressed by the following Table 10.

TABLE 10

| RA | |
|---|---|
| Time index#0 | MCS |
| | NDI |
| | RV |
| | HARQ process ID |
| . . . | . . . |
| Time index#N − 1 | MCS |
| | NDI |
| | RV |
| | HARQ process ID |
| TPC | |
| Etc | |

In the example of Table 10. RA, MCS, TPC, and Etc. (e.g., RV, NDI, HARQ process ID) may be commonly applied to a plurality of time indices and MCS, NDI, RV, and HARQ process 1D may be individually provided to each of the time indices. Accordingly, data transmission may be efficiently scheduled on physical resources all having the same TTI length, however, corresponding to different points in times. Information on a time domain about data assignment corresponding to a plurality of slot indices or OFDM symbol indices for transmission of TB #5 and TB #6 in FIG. 7 may be provided using DCI indication information on the start position and the end position for data assignment proposed in FIG. 6. In addition, final data assignment may be provided to the terminal by additionally performing the 2-stage scheduling proposed in FIG. 7.

Figure 8:
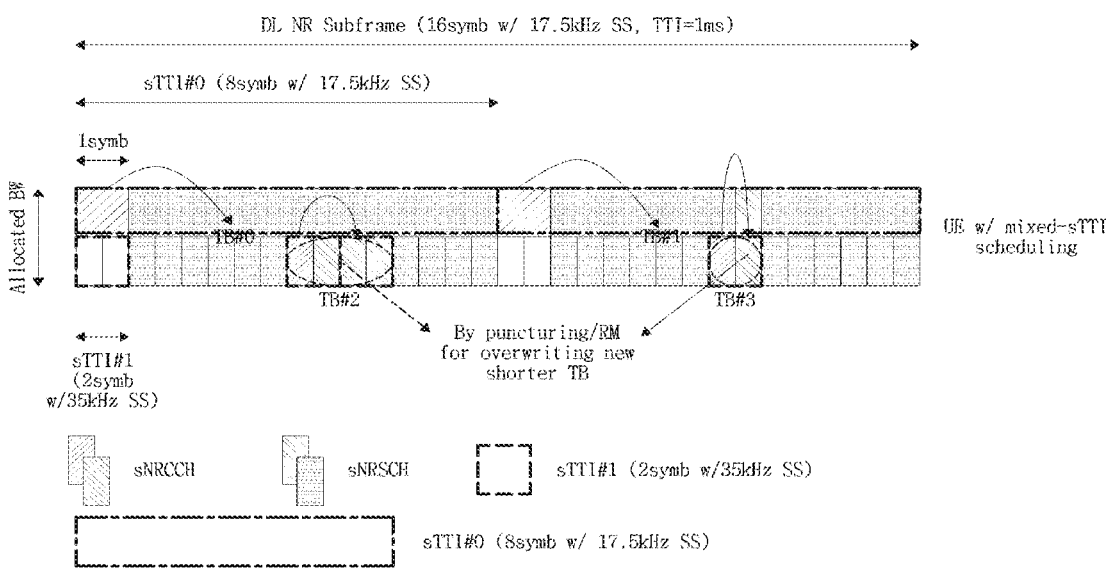
FIG. 8 illustrates an example of overriding resource assignment of longer DCI based on shorter DCI according to the present disclosure.

Although cross TTI scheduling is indicated through the 2-stage scheduling proposed in FIG. 7, the cross-TTI scheduling may also be performed through signaling of the start position and the end position of the data area proposed in FIG. 6 using a single piece of DCI FIG. 8 illustrates an example of overriding resource assignment of longer DCI based on shorter DCI according to the present disclosure.

Referring to the example of FIG. 8, DCI (i.e., longer DCI) of sNRCCH of first (left) sTTI #0 may provide resource assignment information for TB #0 transmission of sNRSCH in the first sTTI #0 and second sTTI #1 to eighth sTTI #1

Additionally. DCI (i.e., shorter DCI) of sNRCCH of fifth sTTI #1 may provide resource assignment information for TB #2 transmission of sNRSCH in the fifth sTTI #1 and sixth sTTI #1. That is, although the longer DCI indicates that the fifth sTTI #1 and sixth sTTI #1 are assigned for TB #0 transmission, such scheduling may be overridden or replaced by the shorter DCI. Therefore, TB #0 transmission may be rate-matched excluding resource elements for TB #2 transmission or may be punctured in the resource elements for TB #2 transmission. Accordingly, new TB #2 transmission may be performed in a portion of a data area in which TB #0 is transmitted, based on the two pieces of DCI (longer DCI and shorter DCI) and the control information corresponding thereto may be provided in advance to the terminal and information on the new TB #2 transmission may be provided to the terminal to prevent the performance from being degraded in receiving at least TB #0.

Also, in the example of FIG. 8, DCI (i.e., longer DCI) of sNRCCH of second (right) sTTI #0 may provide resource assignment information for TB #1 transmission of sNRSCH in the second sTTI #0 and ninth sTTI #1 to sixteenth sTTI #1 Additionally. DCI (i.e., shorter DCI) of sNRCCH of the thirteenth sTTI #1 may provide information regarding that the thirteenth sTTI #1 and a partial time interval of sTTI #0 corresponding to a second symbol section of the thirteenth sTTI #1 are assigned fir TB #3 transmission. That is, although the longer DCI indicates that the thirteenth sTTI #1 and the partial time interval of sTTI #0 corresponding to the second symbol section of the thirteenth sTTI #1 are assigned for TB #1 transmission, such scheduling may be overridden or replaced by the shorter DCI. Accordingly, TB/II transmission may be rate-matched excluding resource elements for TB #3 transmission or may be punctured in the resource elements for TB #3 transmission.

The proposed scheduling method may be applied between different terminals. For example, UE1 may be provided with information on a resource area for a data area in which data is assigned to TWO through longer DCI and corresponding to TB #2 for UE2 through additional DCI signaling. Through this, it is possible to prevent data demodulation performance for TB #0 from being degraded Here, information on the presence of the data area corresponding to TB #2 for UE2 may be provided from the base station to UE1 through DCI signaling using the blank area indication method considered in FIG. 6. Here, referring to FIGS. 6 and 8, a specific data area may be indicated using an OFDM symbol, a slot, and a TTI in a time domain and using RE and RB units in a frequency domain. Also, a blank area may be indicated with being limited to a specific resource area. Here, the blank area may be indicated to be greater than or equal to a resource area for assigning a single code block (CB) or a single code block group (CBG) The specific resource area may be one of CBs/CBGs constituting TB #0 or may be limited to an area corresponding to a portion thereof. Accordingly, new data transmission (e.g., TB #2/3) may be performed by providing a new piece of DCI on a specific resource area within a relatively large resource area that is assigned to transmit a relatively great TB size (e.g., TB #0/1) Although a suitable service varies depending on a different TTI length or a different number of OFDM symbols, the scheduling method may support further flexible and efficient resource utilization and data transmission by considering a characteristic of traffic occurring for each service. For example, although data transmission for the eMBB purpose is indicated by the base station to the terminal, data may need to be quickly and reliably transmitted such as URLLC. In this case, rate-matching or puncturing may be performed in a portion of a resource assigned for the eMBB intended data transmission and a corresponding resource area may be used for URLLC intended traffic transmission.

When the scheduling method is applied, the terminal may additionally perform shorter DCI monitoring. Unless additional signaling for monitoring shorter DCI is performed, the terminal may perform blind decoding to receive shorter DCI within the shorter DCI in addition to an operation of monitoring longer DCI. When the shorter DCI is detected, the terminal may attempt to receive and decode new data based on resource assignment information that is overridden based on the corresponding information. In this case, the terminal may be aware that rate-matching or puncturing is applied to data scheduled by the longer DCI by considering a data transmission assignment area indicated by the detected shorter DCI in a data transmission assignment area indicated by the longer DCI. Accordingly, the terminal may attempt to receive and decode the data scheduled by the longer DCI.

Also, a resource indicated by the shorter DCI for scheduling of new data transmission may perform data transmission in a frequency resource corresponding to the longer TTI and the shorter TTI regardless of a TTI. That is, in the example of FIG. 8, data transmission indicated by the shorter DCI, such as TB #3 transmission, may be scheduled in sTTI #1 and a frequency domain of sTTI #1.

Here, each of DCI transmitted in the shorter TTI and DCI transmitted in the longer TTI may be independently defined for data scheduling in a corresponding TTI. In this case, each piece of DCI may be independently transmitted to the terminal. Alternatively, fields "TIF" and "time index" may be added to the shorter DCI and/or longer DCI. Accordingly, a specific time interval of the longer DCI may be assigned as a resource for data transmission by the shorter DCI.

Embodiment 2

Embodiment 2 relates to a multi-TTI data scheduling method for a terminal to which a mixed multi-TTI is not set or having capability for simultaneously performing transmission and reception in the mixed multi-TTI on the same time. That is, there may be a terminal incapable of performing data transmission and reception in the same multi-TTI due to difficulty of implementation or limit of cost. In particular, since a structure and a standard of a physical channel are different for each of different TTI lengths, the terminal needs to include a multi-processing channel to support simultaneous data transmission and reception in the multi-TTI.

Figure 9:
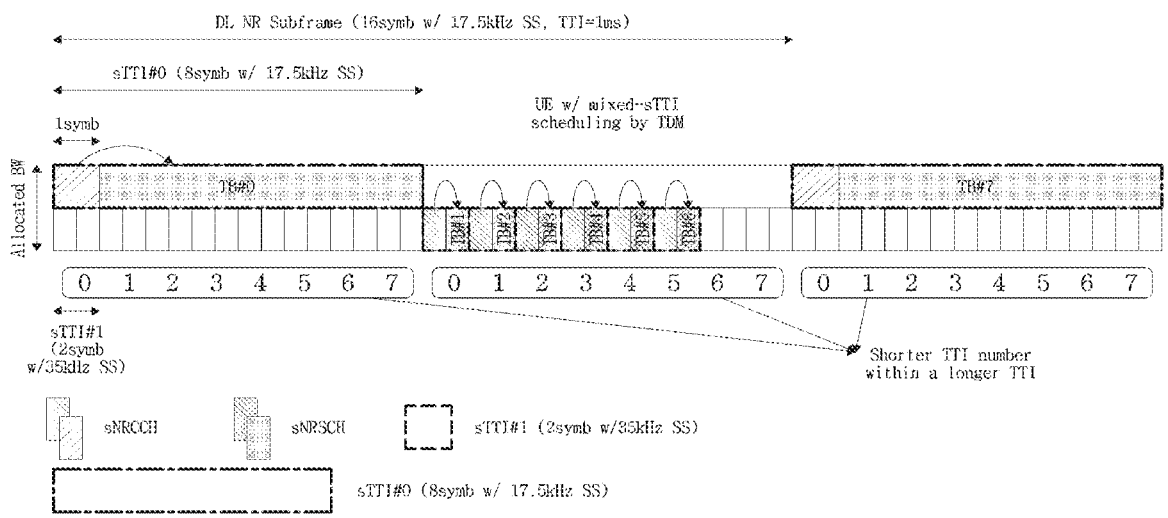
FIG. 9 illustrates an example of DCI based TTI switching according to the present disclosure.

For example, although data transmission and reception may be performed only in a physical resource corresponding to a single TTI length (e.g., either longer TTI or shorter TTI) at a specific position, that is, a specific point in time, a data scheduling method for a terminal capable of semi-statically or dynamically switching an available TTI length over time in response to an indication or a configuration of the base station may be considered. For such operation, the base station may provide a new configuration corresponding to a new (or switching) TTI length through semi-statically signaling, such as upper layer signaling, and also in a further dynamical manner FIG. 9 illustrates an example of DCI based TTI switching according to the present disclosure. To dynamically perform TTI switching for data transmission in resource areas corresponding to different TTIs, the base station may preset a resource area corresponding to an available TTI (e.g., BP) to the terminal and may perform TTI switching through DCI signaling in a set of available resource areas. In this manner, the base station may perform data scheduling for the terminal.

Referring to the example of FIG. 9, the base station may perform data transmission in an area corresponding to a different TTI length over time among areas corresponding to different TTI lengths (e.g., longer TTI such as sTTI #0 and shorter TTI such as sTTI #1). For example, data transmission corresponding to TB #0 may be performed in a longer TTI area during a time interval corresponding to first sTTI #1, data transmission corresponding to TB #1, TB #2, TB #3, TB #4, TB #5, and TB #6 may be performed in a shorter TTI area during a time interval corresponding to second sTTI #0, and data transmission corresponding to TB #7 may be performed in a longer TTI area during a time interval corresponding to third sTTI #0.

If the base station has not provided in advance the terminal with signaling or configuration about switching between different TTI lengths, the terminal may be unaware of a TTI in which data is to be scheduled, and thus may operate as follows.

For example, the terminal may attempt to detect sNRCCH (or DCI) by performing blind decoding in all of control areas of a plurality of TTI lengths (e.g., longer TTI such as sTTI #0 and shorter TTI such as sTTI #1).

Alternatively, similar to the 2-stage DCI signaling method, the terminal may detect sNRCCH (or first type DCI) through blind decoding in a control area within a longer TTI, and may attempt to detect DCI in a control area to be monitored in a shorter TTI through a shorter TTI number, an OFDM/slot index or the aforementioned timing information from control information that is included in the detected first type DCI.

Figure 10:
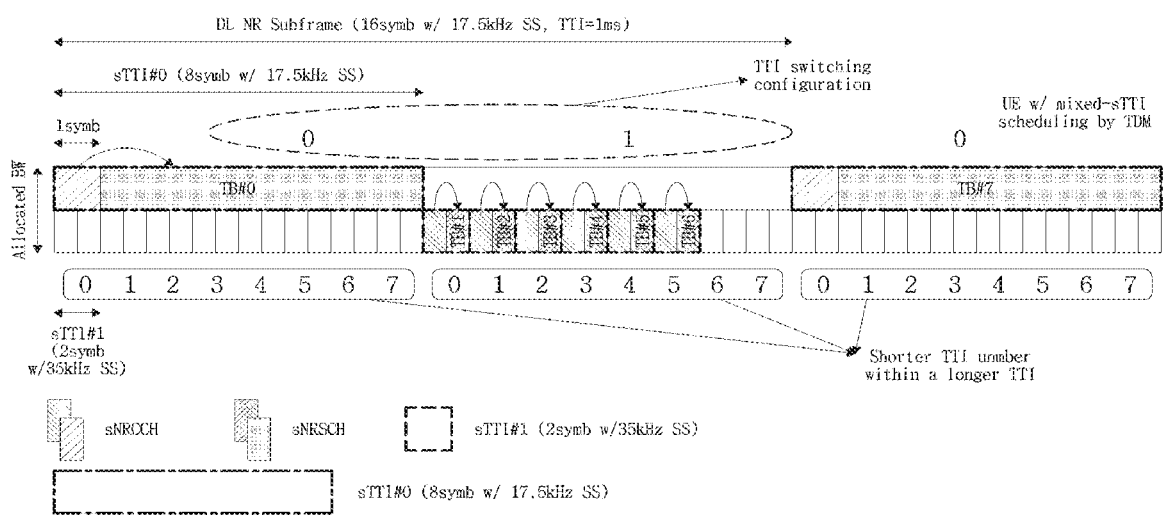
FIG. 10 illustrates an example of preset or common signaling based TTI switching according to the present disclosure.

FIG. 10 illustrates an example of preset/pattern or signaling based TTI switching according to the present disclosure. Through RRC signaling within a set of resource areas BPs) corresponding to different TTI durations considerable in FIG. 9, data transmission and reception may be set to be performed in a resource area corresponding to a different TTI per specific time interval. Alternatively, signaling for TTI switching may be performed through DCI signaling and/or a pattern corresponding to the specific time interval.

Similar to the example of FIG. 9, in the example of FIG. 10, the base station may perform data transmission in an area corresponding to a different TTI length over time among areas corresponding to different TTI lengths (e.g., longer TTI such as sTTI #0 and shorter TTI such as sTTI #1).

Dissimilar to the example of FIG. 9, in the example of FIG. 10, the base station may provide in advance the terminal with signaling or pre-configuration for switching between different TTI lengths. That is, once information, such as a TTI switching configuration, is provided in advance to the terminal, the terminal may determine a corresponding time interval and TTI length available for scheduling data transmission. For example, the base station may indicate to the terminal a TTI length in which control information and/or data transmission is available based on a unit oldie longer TTI or NR subframe.

The TTI switching configuration may be provided from the base station to the terminal through upper layer signaling.

Alternatively, the TTI switching configuration may be provided from the base station to the terminal through specific DCI/common DCI signaling. The common DCI may be transmitted to provide common control information group-specifically (i.e., to a plurality of terminals belonging to a specific group) on a physical resource corresponding to a specific TTI length.

Also, the terminal may expect DCI and data transmission in only a single TTI during a specific time interval corresponding to the longer TTI.

Although FIGS. 9 and 10 illustrate examples in which different types of TTIs (e.g., longer TTI such as sTTI #0 and shorter TTI such as sTTI #1) are distinguishably assigned to different frequency domains, a mapping relationship between the frequency domain and the TTIP type is not limited thereto. Different types of TTIs may be applied depending on a time interval, in a single identical frequency domain.

Signaling and DCI field information associated with all of the scheduling methods proposed in FIGS. 3 to 10 may be combined with each other and thereby employed. Corresponding DCI and RRC signaling information and a structure thereof may vary depending on a scheduling method and signaling information to be provided to terminals. Accordingly, the methods proposed in FIGS. 3 to 10 may be implemented through various combinations. For example, based on a base station configuration for resource areas (e.g., BPs) corresponding to different TTI durations that are basically considered in FIGS. 3 to 10, data scheduling may be indicated to the terminal through DCI only on a resource area (e.g., BP) corresponding to a portion thereof or at least one different TTI duration Information on start and end positions for such data scheduling may be additionally provided to the terminal through DCI. Referring to FIGS. 6 and 8, new DCI signaling may be provided to the corresponding terminal to assign a data area for new TB transmission in addition to a resource area in which a specific TB is assigned to a data area. DCI signaling and RRC configuration to support such a function is provided from the base station to the terminal.

Figure 11:
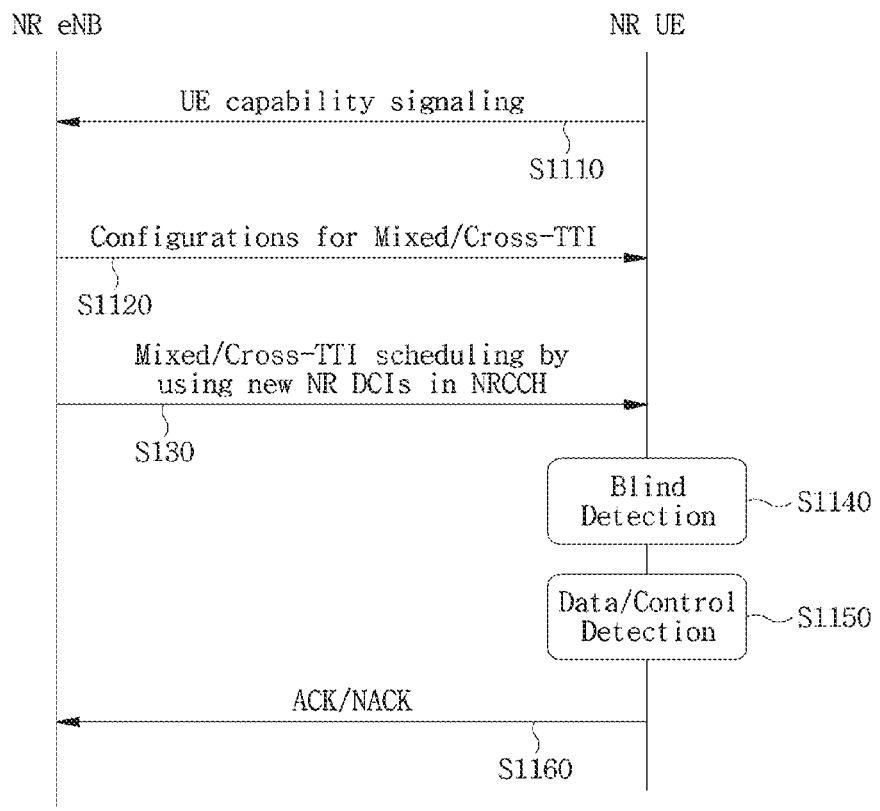
FIG. 11 illustrates an example of a method for transmission and reception of a control channel and a data channel based on a plurality of numerologies in an NR system according to the present disclosure.

FIG. 11 illustrates an example of a method for transmission and reception of a control channel and a data channel based on a plurality of numerologies in an NR system according to the present disclosure.

Referring to FIG. 11, in operation S1110, an NR UE may report to an NR eNB about UE capability. For example, the LIE capability may include information regarding whether the NR UE supports a mixed multi-TTI.

In operation S1120, the NR eNB may provide the terminal with a configuration for mixed-TTI scheduling of cross-TTI scheduling based on the UE capability.

In operation S1130, the NR eNB may generate resource assignment information for data (NRSCH) transmission in a new NR DCI format depending on the mixed-TTI or cross-TTI scheduling method and may transmit the generated resource assignment information to the terminal through NRCCH.

In operation S1140, the NR UE may acquire NR DCI by performing blind detection on the NRCCH transmitted from the NR eNB.

In operation S1150, the NR UE may verify the resource assignment information for data transmission based on the NR DCI acquired in operation S1140 and may attempt to receive and decode data on a corresponding, resource.

Alternatively, in operation S1150, the NR UE may verify a resource candidate for data transmission based on the NR DCI (e.g., first type DCI) acquired in operation S1140 and may attempt to detect additional NR DCI (e.g., second type DCI) on the corresponding resource candidate. Accordingly, resource assignment information for data transmission may be determined based on a combination of the first type DCI and the second type DCI (i.e., 2-stage method) Accordingly, the NR UE may attempt to receive and decode data on the corresponding resource.

In operation S1160, if the data is successfully decoded, the NR (JE may feed back ACK to the NR eNB. Otherwise, the NR OF may feed back NACK to the NR eNB.

As described above, according to the present disclosure, resources supporting different TTI types within a single frequency domain area (e.g., carrier or component carrier) may be multiplexed using an FDM scheme, a TDM scheme, or an FDM-TDM scheme, and may include resources supporting a plurality of different types of TTIs within an NR subframe. Here, resources supporting different TTIs may have a scalable relationship. In this case, it is possible to increase a utilization of system resources and to efficiently support multi-TTI based data scheduling based on a correlation between the NRCCH (or sNRCCH) and the NRSCH (or sNRSCH) and a DCI format for the same.

Although the aforementioned methods are described in series of operations for clarity of description, they are not provided to limit order in which each operation is performed and operations may be performed simultaneously or in different order if necessary. Also, a portion of the operations may be omitted to implement the method according to the present disclosure.

The aforementioned embodiments include examples about various aspects. Although all of the possible combinations representing the various aspects may not be described herein, those skilled in the art may be aware that the various combinations are possible. Accordingly, the present disclosure should be understood to include all other replacements, modifications, and changes within the scope of the claims.

Figure 12:
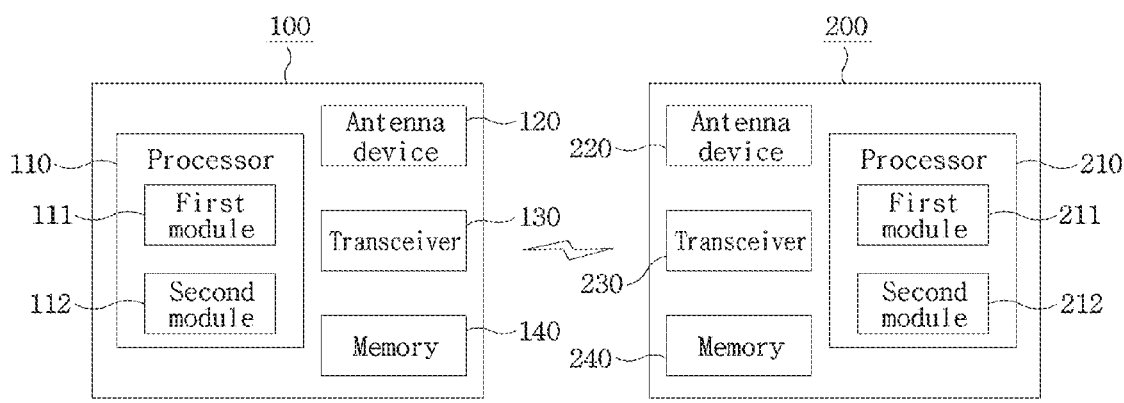
FIG. 12 is a diagram illustrating a configuration of a wireless device according to the present disclosure.

The scope of the present disclosure includes an apparatus (e.g., a wireless device and components thereof that are described with reference to FIG. 12) configured to process or implement operations according to various embodiments FIG. 12 is a diagram illustrating a configuration of a wireless device according to the present disclosure.

FIG. 12 illustrates an NR UE apparatus 100 corresponding to an uplink transmission apparatus or a downlink reception apparatus and an NR eNB apparatus 200 corresponding to a downlink transmission apparatus or an uplink reception apparatus.

The NR UE apparatus 100 may include a processor 110, an antenna device 120, a transceiver 130, and a memory 140.

The processor 110 may perform baseband-related signal processing and may include a first module and a second module. The first module may correspond to an upper layer processing and may process an operation of a Medium Access Control (MAC) layer, a Radio Resource Control (RRC) layer, or more upper layers. The second module may correspond to a physical (PITY) layer processing and may process an operation (e.g., an uplink transmission signal processing and downlink received signal processing) of a PHY layer. However, it is provided as an example only, and the first module and the second module may be configured as a single integrated module and may also be configured using three or more separate modules. In addition to performing baseband related signal processing, the processor 110 may control the overall operation of the NR LIE apparatus 100.

The antenna device 120 may include at least one physical antenna. If the antenna device 120 includes a plurality of antennas, Multiple Input Multiple Output (MIMO) transmission and reception may be supported. The transceiver 130 may include a radio frequency (RF) transmitter and an RF receiver. The memory 140 may store software, an operating system (OS), an application, etc., associated with an operation of the NR UE apparatus 100, and may include a component such as a buffer.

The NR eNB apparatus 200 may include a processor 210, an antenna device 220, a transceiver 230, and a memory 240.

The processor 210 may perform baseband related signal processing and may include a first module and a second module. The first module may correspond to an upper layer processing and may process an operation of a MAC layer, an RRC layer, or more upper layers. The second module may correspond to a PHY layer processing and may process an operation (e.g., an uplink transmission signal processing and downlink received signal processing) of a PHY layer. However, it is prodded as an example only, and the first module and the second module may be configured as a single integrated module and may also be configured using three or more separate modules. In addition to performing baseband related signal processing, the processor 210 may control the overall operation of the NR eNB apparatus 200.

The antenna device 220 may include at least one physical antenna. If the antenna device 220 includes a plurality of antennas, MIMO transmission and reception may be supported. The transceiver 230 may include an RF transmitter and an RE receiver. The memory 240 may store software, an OS, an application, etc., associated with an operation of the NR eNB apparatus 200, and may include a component such as a buffer.

The second module 112 of the NR LIE apparatus 100 may receive at least one of first type DCI and second type DCI in at least one of a first type TTI (e.g., longer TTI) and a second type TTI (e.g., shorter TTI) Also, the second module 112 may determine a resource for data transmission in at least one of the first type TTI and the second type TTI based on at least one of the first type DCI and the second type DCI. Also, the second module 112 may include an operation of receiving data from the NR eNB apparatus 200 on the determined resource. The second module 112 may transmit the received data to the first module 111. The first module III may attempt to decode data. If the data is successfully decoded, the first module III may generate ACK and transmit the same to the NR eNB apparatus 200, and otherwise, may generate NACK and transmit the same to the NR eNB apparatus 200.

The second module 212 of the NR eNB apparatus 200 may transmit at least one of the first type DCI and the second type DCI to the terminal in at least one of the first type TTI (e.g., longer TTI) and the second type TTI (e.g., Shorter TTI). Here, at least one of the first type DCI and the second type DCI may include resource assignment information for data that is transmitted in at least one of the first type TTI and the second type TTI The second module 212 may transmit data to the NR LIE apparatus 100 on the resource that is determined based on the resource assignment information. Also, the second module 212 may transmit ACK/NACK information received from the NR UE apparatus 100 to the first module 211. The first module 211 may determine whether to perform retransmission to the NR UE 100 based on the ACK/NACK information.

The aforementioned operation of the processor 110 of the NR UE apparatus 100 or processor 210 of the NR eNB apparatus 200 may be implemented through software processing or hardware processing, or may be implemented through software and hardware processing.

The scope of the present disclosure includes software (or, an OS, an application, firmware, a program, etc.) configured to implement operations according to various embodiments on an apparatus or a computer and a medium configured to store and execute such software on the apparatus or the computer.

What is claimed is:

1. One or more non-transitory computer readable storage media encoded with instructions that, when executed by a processor, cause the processor to perform operations, comprising:
receiving, by a wireless device, one or more radio resource control (RRC) signals indicating a number of first bandwidth parts and a number of second bandwidth parts configured for the wireless device;
receiving a first downlink control information (DCI) comprising a first indicator field that indicates at least one of the first bandwidth parts, wherein a bitwidth of the first indicator field is based on the number of the first bandwidth parts configured for the wireless device;
receiving a second DCI comprising a second indicator field that indicates at least one of the second bandwidth parts, wherein a second bitwidth of the second indicator field is based on the number of the second bandwidth parts configured for the wireless device;
determining, based on the bitwidth and based on the DCI, a value within the first indicator field;
determining, based on the value within the first indicator field, one or more first resources of the at least one of the first bandwidth parts;
determining, based on the second bitwidth and based on the second DCI, a value of the second indicator field;
determining, based on the value of the second indicator field, one or more second resources of the at least one of the second bandwidth parts; and
performing a first data communication based on the one or more first resources and a second data communication based on the one or more second resource.

2. The non-transitory computer readable storage media of claim 1, wherein:
the first bandwidth parts correspond to a plurality of uplink bandwidth parts, and the second bandwidth parts correspond to a plurality of downlink bandwidth parts.

3. The non-transitory computer readable storage media of claim 1, wherein the number of the first bandwidth parts configured for the wireless device is semi-statically configured, and wherein the number of the first bandwidth parts configured for the wireless device indicates the bitwidth of the first indicator field as one of 0, 1, or 2.

4. The non-transitory computer readable storage media of claim 1, wherein the one or more RRC signals indicate the wireless device to monitor a physical resource region corresponding to a particular transmission time interval (TTI).

5. The non-transitory computer readable storage media of claim 1, wherein the first DCI comprises an assignment field indicating start and end points of a data assignment and wherein the assignment field is associated with a combination of slot information and symbol information of the at least one of the first bandwidth parts.

6. The non-transitory computer readable storage media of claim 5, wherein the data assignment is associated with a physical uplink shared channel or a physical downlink shared channel.

7. The non-transitory computer readable storage media of claim 1, wherein the instructions, when executed by the processor, cause the processor to perform further operations, comprising:
receiving other DCI indicating a deactivation of the at least one of the first bandwidth parts and indicating an activation of a different bandwidth part of the first bandwidth parts.

8. The non-transitory computer readable storage media of claim 1, wherein the instructions, when executed by the processor, cause the processor to perform further operations, comprising:
receiving another RRC signal indicating a deactivation of the at least one of the first bandwidth parts and indicating an activation of a different bandwidth part of the first bandwidth parts.

9. The non-transitory computer readable storage media of claim 1, wherein the instructions, when executed by the processor, cause the processor to perform further operations, comprising:
receiving configuration information, of the at least one of the first bandwidth parts, comprising subcarrier spacing information, cyclic prefix information, and frequency information.

10. The non-transitory computer readable storage media of claim 1, wherein:
the first bandwidth parts correspond to a plurality of downlink bandwidth parts, and the second bandwidth parts correspond to a plurality of uplink bandwidth parts.

11. One or more non-transitory computer readable storage media encoded with instructions that, when executed by a processor, cause the processor to perform operations, comprising:
transmitting, by a base station to a wireless device, one or more radio resource control (RRC) signals indicating a number of first bandwidth parts and a number of second bandwidth parts configured for the wireless device;
determining, based on the number of the first bandwidth parts configured for the wireless device, a bitwidth of a first indicator field of a first downlink control information (DCI);
generating, based on the bitwidth, the first DCI comprising a value, for the first indicator field, that indicates at least one of the first bandwidth parts, wherein the value for the first indicator field is associated with one or more resources of the at least one of the first bandwidth parts;
determining, based on the number of the second bandwidth parts configured for the wireless device, a second bitwidth of a second indicator field of a second DCI;
generating, based on the second bitwidth, the second DCI comprising a value, of the second indicator field, that indicates at least one of the second bandwidth parts, wherein the value of the second indicator field is associated with one or more second resources of the at least one of the second bandwidth parts,
transmitting, to the wireless device, the first DCI and the second DCI, and
performing a first data communication with the wireless device and, based on the one or more second resources, a second data communication with the wireless device.

12. The non-transitory computer readable storage media of claim 11, wherein:
the first bandwidth parts correspond to a plurality of uplink bandwidth parts, and the second bandwidth parts correspond to a plurality of downlink bandwidth parts.

13. The non-transitory computer readable storage media of claim 11, wherein the number of the first bandwidth parts configured for the wireless device is semi-statically configured, and wherein the number of the first bandwidth parts configured for the wireless device indicates the bitwidth of the first indicator field as one of 0, 1, or 2.

14. The non-transitory computer readable storage media of claim 11, wherein the one or more RRC signals indicate the wireless device to monitor a physical resource region corresponding to a particular transmission time interval (TTI).

15. The non-transitory computer readable storage media of claim 11, wherein the first DCI comprises an assignment field indicating start and end points of a data assignment and wherein the assignment field is associated with a combination of slot information and symbol information of the at least one of the first bandwidth parts.

16. The non-transitory computer readable storage media of claim 15, wherein the data assignment is associated with a physical uplink shared channel or a physical downlink shared channel.

17. The non-transitory computer readable storage media of claim 11, wherein the instructions, when executed by the processor, cause the processor to perform further operations, comprising:
- transmitting, to the wireless device, other DCI indicating a deactivation of the at least one of the first bandwidth parts and indicating an activation of a different bandwidth part of the first bandwidth parts.

18. The non-transitory computer readable storage media of claim 11, wherein the instructions, when executed by the processor, cause the processor to perform further operations, comprising:
- transmitting, to the wireless device, another RRC signal indicating a deactivation of the at least one of the first bandwidth parts and indicating an activation of a different bandwidth part of the first bandwidth parts.

19. The non-transitory computer readable storage media of claim 11, wherein the instructions, when executed by the processor, cause the processor to perform further operations, comprising:
- transmitting, to the wireless device, configuration information, of the at least one of the first bandwidth parts, comprising subcarrier spacing information, cyclic prefix information, and frequency information.

20. The non-transitory computer readable storage media of claim 11, wherein:
- the first bandwidth parts correspond to a plurality of downlink bandwidth parts, and the second bandwidth parts correspond to a plurality of uplink bandwidth part.

* * * * *